United States Patent
Chellappan et al.

(10) Patent No.: US 12,504,911 B2
(45) Date of Patent: Dec. 23, 2025

(54) METHOD AND SYSTEM OF STANDARDS-BASED AUDIO FUNCTION PROCESSING WITH REDUCED MEMORY USAGE

(71) Applicant: Intel Corporation, Santa Clara, CA (US)

(72) Inventors: Satheesh Chellappan, Folsom, CA (US); Tomasz Pielaszkiewicz, Gdansk (PL); Devon Worrell, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 17/666,914

(22) Filed: Feb. 8, 2022

(65) Prior Publication Data
US 2022/0164130 A1 May 26, 2022

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)

(58) Field of Classification Search
CPC ...... G06F 3/162; G06F 3/0655; G06F 3/0604; G06F 3/0679; G06F 2212/1024; G06F 2212/1048; G06F 2212/1044; G06F 12/0292
See application file for complete search history.

(56) References Cited

U.S. PATENT DOCUMENTS

2020/0272519 A1 * 8/2020 Srivastava ............ G06F 9/5038

FOREIGN PATENT DOCUMENTS

WO    WO-0157872 A1 * 8/2001 ........... G06F 21/572

OTHER PUBLICATIONS

Mipi Alliance, "Draft Specification for SoundWire Device Class for Audio", Draft Version 0.6; Revision 07, Apr. 15, 2020.
Mipi Alliance, "Specification for SoundWire", Version 1.2, Jan. 23, 2019.
Wikipedia, "Translation lookaside buffer", retrieved from https://en.wikipedia.org/wiki/Translation_lookaside_buffer; 2022.

* cited by examiner

*Primary Examiner* — Curtis James Kortman
(74) *Attorney, Agent, or Firm* — Akona IP PC

(57) ABSTRACT

A system, article, and method of standards-based audio function processing has reduced memory usage by using an address mapping table.

25 Claims, 13 Drawing Sheets

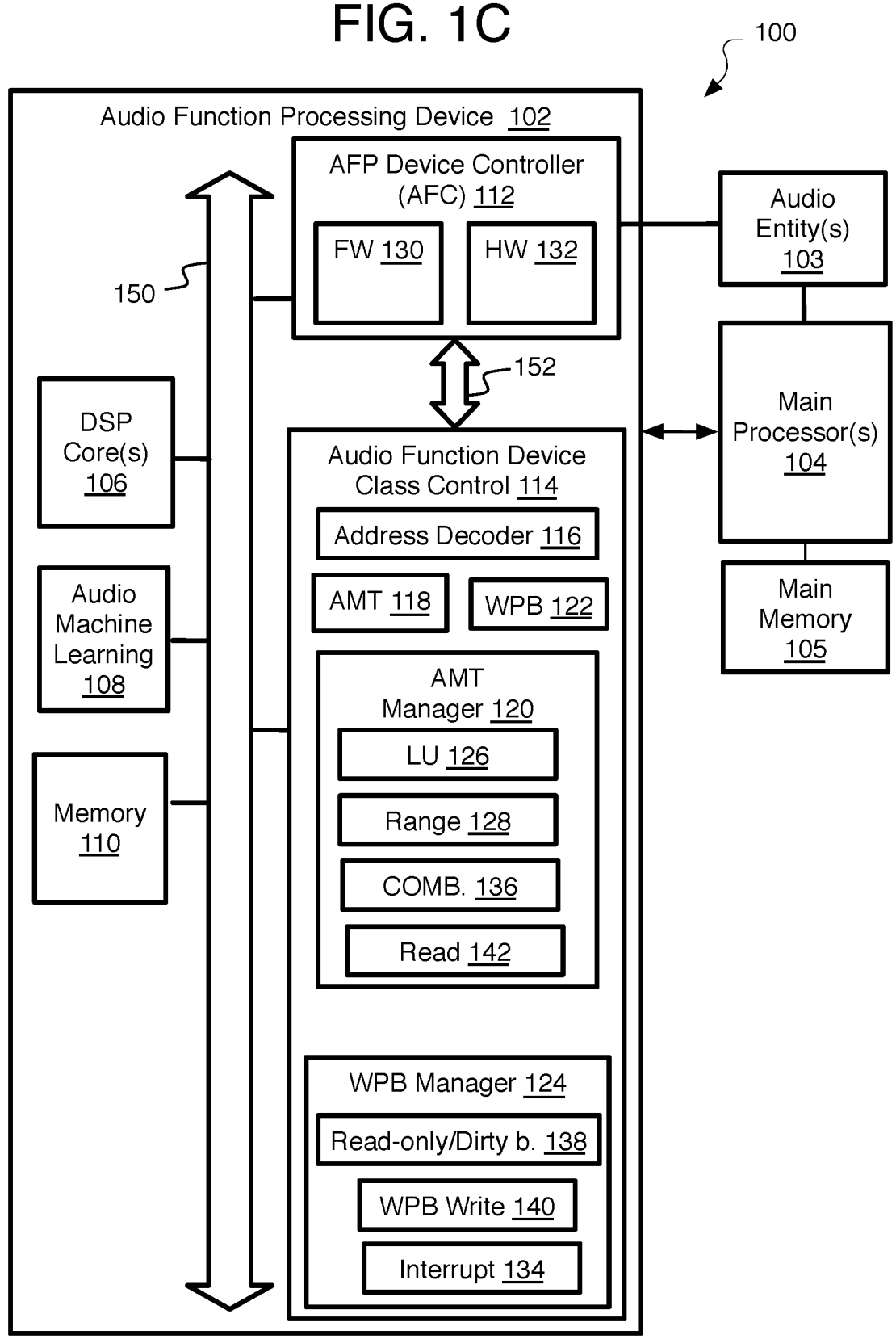

RECEIVE A FIRST ADDRESS IN A FORMAT OF AN AUDIO FUNCTION PROCESSING INTERFACE STANDARD
202

↓

CONVERT THE FIRST ADDRESS INTO A MEMORY ADDRESS USING AN ADDRESS MAPPING TABLE 204

> USE THE FIRST ADDRESS TO GENERATE A LOOK-UP WITH A BIT SIZE SET TO REDUCE A NUMBER OF MEMORY ADDRESS PORTIONS EACH OF A DIFFERENT MEMORY ADDRESS AVAILABLE BY USING THE ADDRESS MAPPING TABLE
> 206

↓

PROVIDE THE MEMORY ADDRESS TO PERFORM A READ OR WRITE TO THE MEMORY ADDRESS ON A MEMORY
208

> USE A WRITE PENDING BUFFER TO MANAGE WRITES
> 210

| | ENABLE | READ-ONLY | DIRTY | MEMORY ADDRESS | |
|---|---|---|---|---|---|
| | | | | Look-up | MSBs |
| Control | | | | | |
| | | | | | |
| | | | | | |
| Non-Control | | | | | |
| | | | | | |
| | | | | | |

| INTR. | MULTI-WRITE | DATA | ADDRESS |
|---|---|---|---|
| | | | |
| | | | |
| | | | |

FIG. 8A
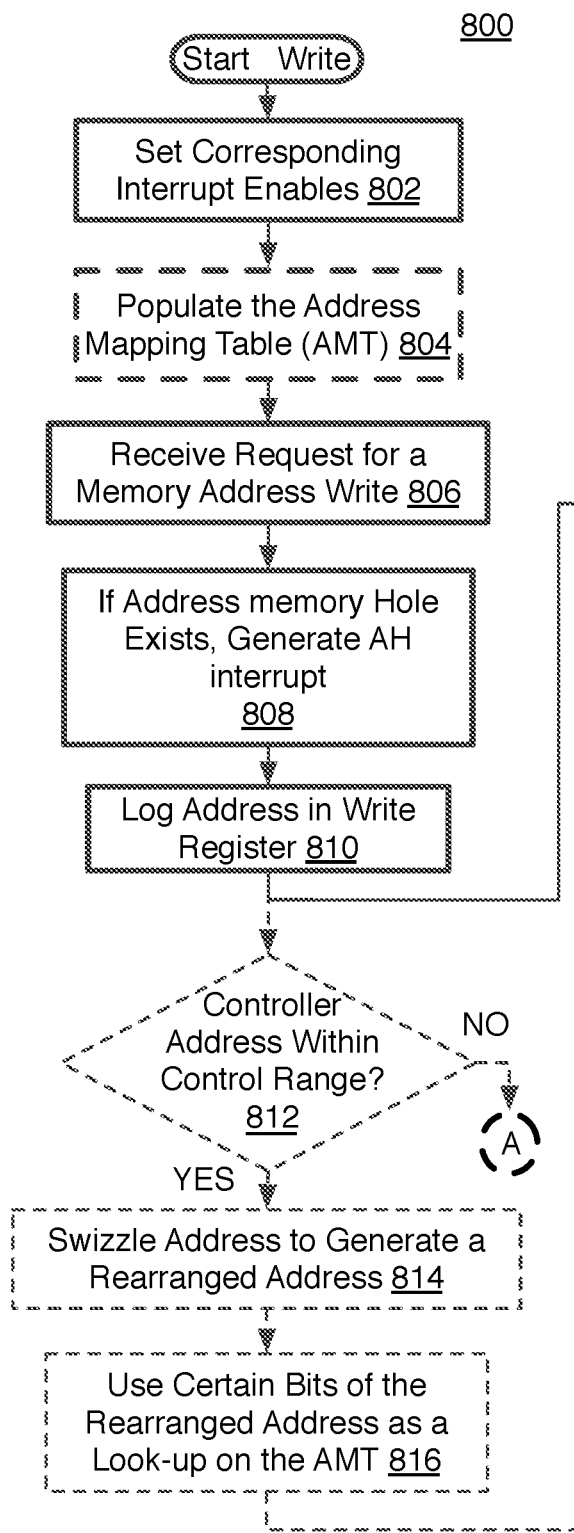
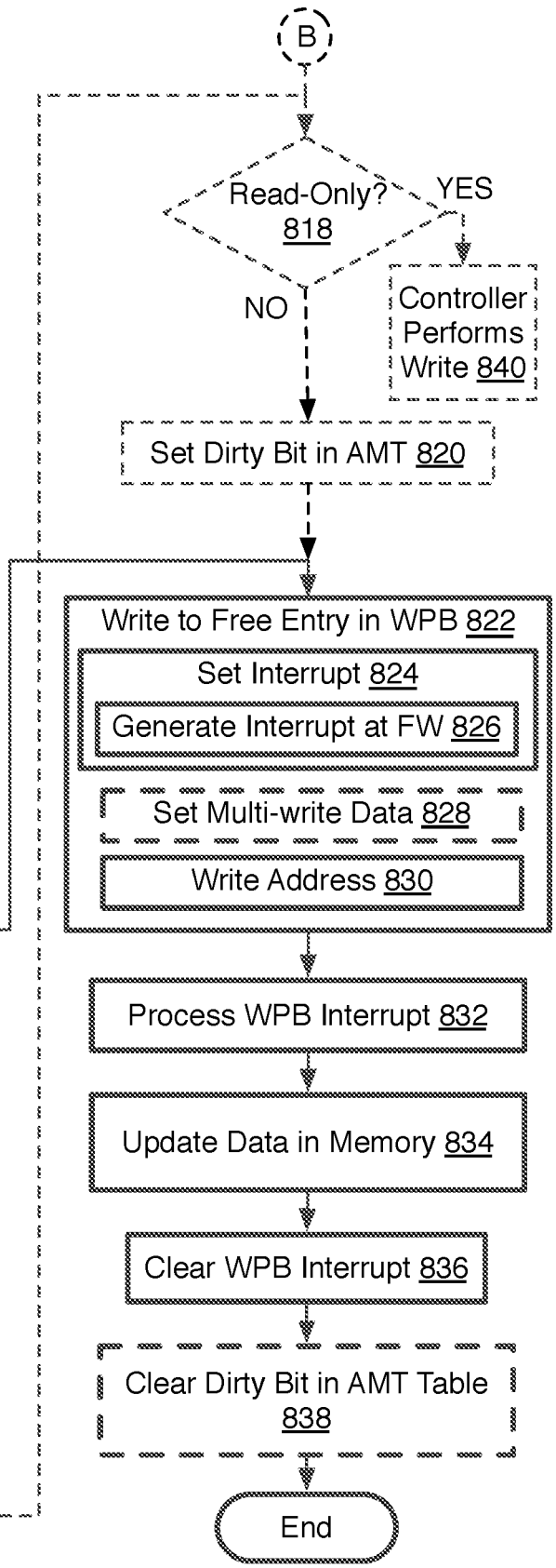

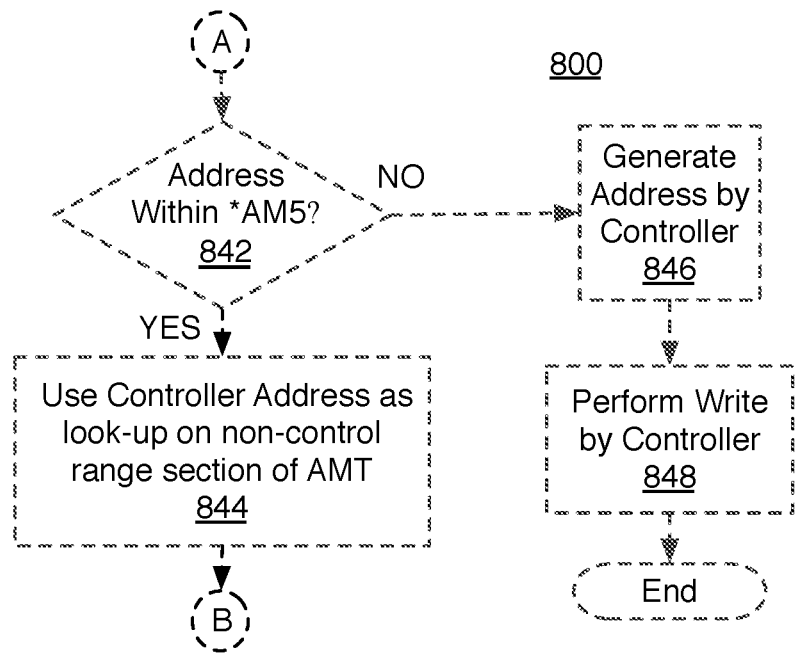
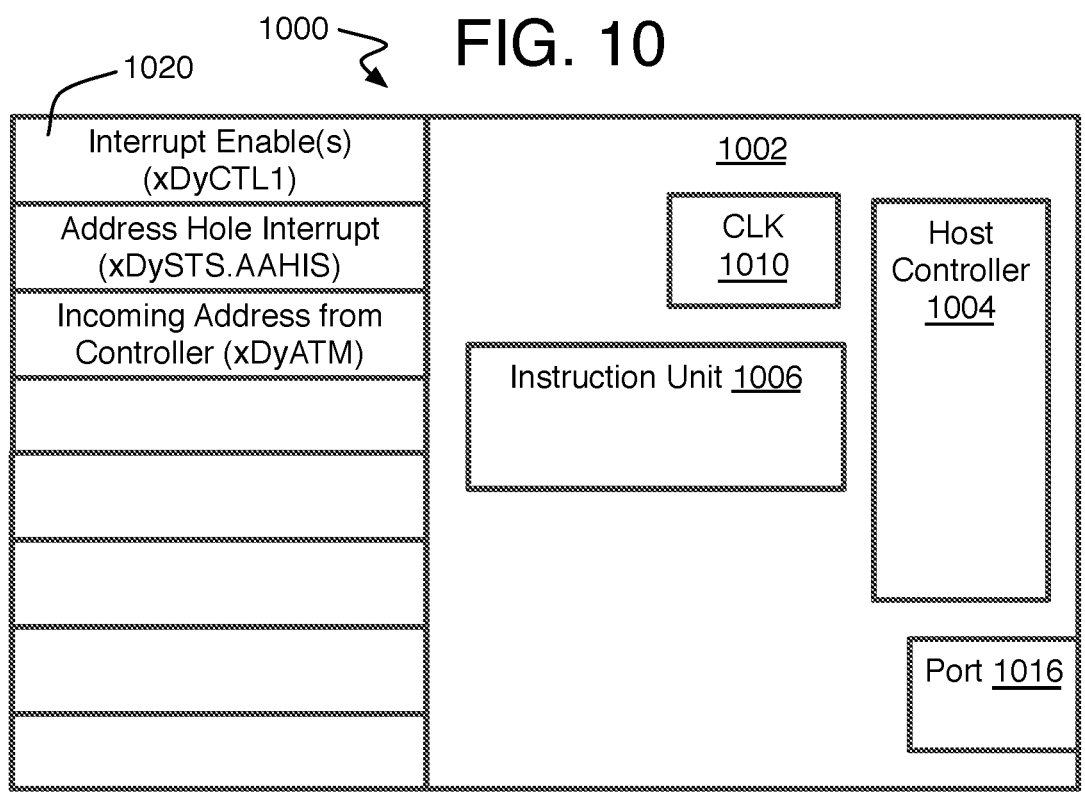

METHOD AND SYSTEM OF STANDARDS-BASED AUDIO FUNCTION PROCESSING WITH REDUCED MEMORY USAGE

BACKGROUND

Mobile Industry Processor Interface (MIPI) specifications provide for audio input-output (IO) protocols and define standard audio device driver specifications. SoundWire® is one such MIPI standard audio specification that is used by audio function processing interface devices. SoundWire® includes a specific sub-standard referred to as SoundWire® device class for audio (SDCA) which is provided for certain audio functions or pre-processing to format audio signals for end applications. Such functions may include noise cancellation, audio capture, audio mixing, audio rendering, volume or gain control, loudspeaker selection, quality settings, left and right balance or fade channel settings, bandwidth controls, and so forth.

The audio function processing devices that use these standards have many control settings that are stored in memory at specific memory addresses. Every time a control must be looked up or updated, the operation requires a memory transaction such as a read or a write. These accesses are usually performed by firmware operated by central processing units (CPUs) or digital signal processors (DSPs). Since each control memory address can be very large, requiring a memory address range of 1.2 GB to provide all desired controls, such memory accesses can require a relatively large computational load, which in turn consumes large amounts of power such that audio function processing according to the known specifications are wasteful on computers such as laptops, and are often impractical for small devices.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1C is a schematic diagram showing an example audio function processing device according to at least one of the implementations described herein;

FIG. 2 is a flow chart of an example audio function processing method with reduced memory usage according to at least one of the implementations described herein;

FIGS. 8A-8B is a detailed flow chart of an example audio function processing method performing a write with reduced memory usage according to at least one of the implementations described herein;

FIG. 10 is a schematic diagram of example audio function processing hardware according to at least one of the implementations described herein;

DETAILED DESCRIPTION

Figure 1A:
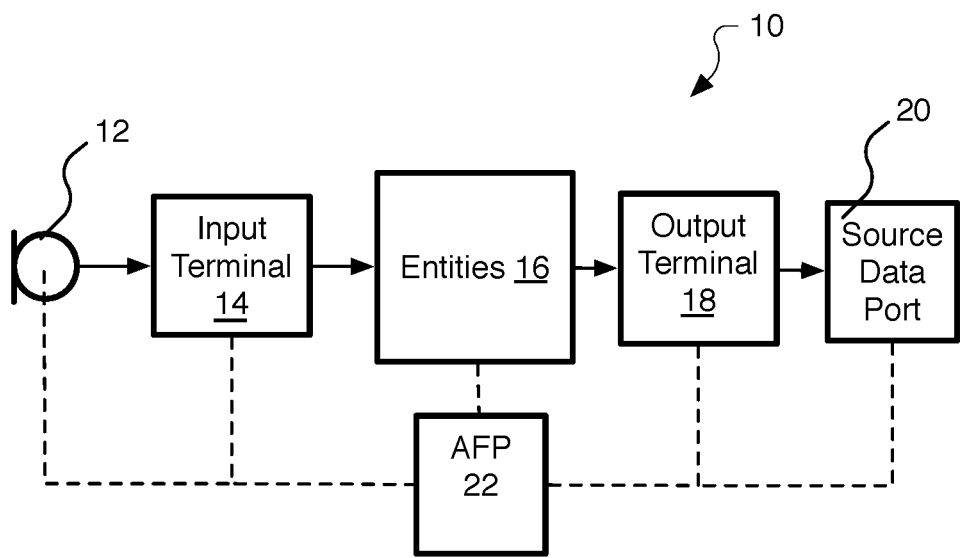
FIG. 1A is a schematic diagram of an example audio processing system according to at least one of the implementations described herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes, unless specifically described herein. For instance, various architectures employing, for example, multiple integrated circuit (IC) chips and/or packages, and/or various computing devices and/or consumer electronic (CE) devices such as laptop or desktop computers, tablets, mobile devices such as smart phones or other smart devices, video game panels or consoles, high definition audio systems, surround sound or neural surround home theatres, television set top boxes, on-board vehicle systems, dictation machines, security and environment control systems for buildings, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof unless specifically described herein.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical, or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, devices, and methods of standards-based audio function processing with reduced memory usage are described herein.

Audio function processing devices use audio function processing interface specifications, such as SDCA. Such standards may provide for control indicators in the form of hierarchical memory addresses and that have a particular format. Thus, a control address may have fields with reserved bits for audio attributes such as a function including volume or signal mixing, an entity indicator where entities are devices being controlled such as speakers, microphones, mixers, and so forth, control selector bits that indicate the target or desired parameter setting for the control, a control number to indicate the specific control or control type, as well as other fields. These standard control addresses are input-output (IO) addresses that may be used directly as a virtual memory address for read or write accesses from or to memory, or converted to a physical memory address of local on-board memory.

The available virtual memory address range from the SDCA standards is 1.2 GB to provide memory addresses for 64 different controls, and 64 more fields for audio streaming data blocks and implementation data to operate the audio function processing device. The audio streaming data to be stored or retrieved from memory may be audio signal data used for audio streaming, referred to as a memory function address or memory block address, versus a control function address, for example. The implementation function data accesses are used for operation and maintenance of the audio function processing such as for firmware downloads, audio history buffer (HB) transfers, and other data for specific functions or entities. The total required memory capacity then is often 128 MB of memory address fields to be stored in local memory such as read access memory (RAM), or more precisely static RAM (SRAM) providing cache for the system.

Fixed function audio codec chips, when provided and typically forming hardware on a standards-based audio processing devices, are companion chips to main processors and other audio processing devices so that many memory transactions can be performed locally. These arrangements, however, often cannot handle the large address range (for 1.2 GB) while determining corresponding memory addresses. Specifically, typical local SRAM does not have the capacity to store the 128 MB, or if such capacity exists, it drastically reduces the efficiency of the memory transactions, even when the memory is a double data rate (DDR) system. To compensate for this disadvantage, a reduced amount of the memory range may be used at once, such as 8 MB. But this memory capacity requirement often still is too large and inefficient, such that the system usually defaults to firmware operated by main CPU processor(s) or DSPs providing audio processing, which consumes a large amount of power.

The power consumption is made worse during "always-on" listening modes where the system will waken from a low power sleep mode upon detecting a keyword or phrase, such as "Hey Alexa." The audio-function based memory access for this mode is usually frequent and asynchronous to main computing device operations so that when a computing device such as a smartphone or laptop is operating in the "always-on" listening mode and is sleeping, the computing device's main CPU and/or DSPs are awakened anyway so that firmware or the DSPs can determine addresses for memory accesses. This limits the device's ability to reach full potential sleep mode durations to reduce a full potential amount of power consumption.

Some conventional systems use embedded micro-controllers to process the access. These systems, however, are not built to reduce power consumption and often have additional overhead for firmware driver updating that is extremely complex and has all access managed by a DSP or uController. This results in too much power consumption as well. Such conventional systems also result in devices with large memory footprints to handle the large addresses.

To resolve these issues, the presently disclosed method, system, and device significantly reduces power consumption during audio function processing memory accesses by implementing a memory management strategy that efficiently uses an address mapping (or redirection) table (AMT) by substantially reducing the bit size of the standard addresses to generate look-ups for the AMT. By having an AMT that uses a look-up with a smaller number of bits, the AMT is forced to operate on a smaller memory address range, which can be easily handled locally without waking CPUs to operate firmware or DSPs. With the strategies herein, it has been found that the small bit size look-up technique is adequate to provide accurate memory addresses for reads and writes on a local memory.

Specifically, the AMT may have an AMT manager that is aware of the standard full audio function processing controller addresses and uses the AMT to remap the addresses to a local memory such as L2 SRAM addresses, for example. The disclosed AMT has intelligent decoding and smart memory management. The decoding may be compatible with the specific audio function standard being used, and the AMT manager may use smart memory management to provide a programmable cache size (or other memory)

address range for each of the audio attributes, hence reducing the overall memory requirement of the system. Since the reads need to be performed by the audio function processing hardware to save power, the AMT table manager itself may initiate the local memory access based on the remapped address and returns the read data. Based on certain system architecture, specific fields in input addresses may be used to indicate that a current write is being handled by the hardware and the AMT to keep the power and latency to a minimum. Otherwise, the controller address may be used directly to perform writes since writes are usually relatively rare during low-power modes. Either way, writes may be accumulated in the WPB, and an interrupt is generated intermittently to reduce power and the number of interrupts provided to the DSP.

In more detail, the remapping may be accomplished by dropping particular bit locations in the longer standard (or controller) address and uniting separate fields of the same data type on the controller address. Particularly, the standard controller address has multiple fields (for each category) to identify function, entity, control selection, and control number, as well unspecified empty fields that can be customized for use by particular devices (or entities) such as speakers, microphones, mixers, amplifiers, audio jack codec, and so forth. A swizzling operation may be performed to rearrange the used or important bits. For example, all function fields may be concatenated together, and the same may be applied for entity, control selection, and control number. Then the other fields may be dropped. Some number of the most significant bits of the rearranged address then may be used as a look-up on the AMT to find corresponding most significant bits of the physical memory (or cache) address on the AMT. The most significant bits of the memory address then can be combined, such as concatenated, to other bits of the rearranged address to form the full memory address that is on the memory.

By one form, the system uses the rearranged address when the controller address is within a control address range where the controller address actually indicates a control selection. Otherwise, when the controller address is directed to audio streaming data or implementation data, then bits from the controller address are used directly as the shorter look-up for searching the AMT. The bits of the corresponding memory address portion on the AMT are then combined with other bits on the controller address.

The reduced memory address size permits audio function processing hardware to handle the memory address determinations and read accesses without unnecessarily awakening a CPU by using firmware or a DSP. This is particularly efficient because read operations that require no change in memory data far outnumber write operations that still require firmware to be used to perform the writing operation itself. Thus, to further increase efficiency and lower power consumption, writes are treated differently than the reads. For the writes, a write pending buffer (WPB) also may be used and that stores a write and an address to be written. The write addresses either may be the incoming controller address itself when writes are rare or the full memory addresses generated by using the AMTs and used to reduce power and required total memory capacity. The WPB collects the writes over time. The firmware or DSP is then awakened merely to perform the writes intermittently or at some interval rather than having the CPU being awakened continuously to perform the writes, which further reduces the power consumption. Thus, the use of the WPB permits better control of the timing of the writes. This provides data coherency for IO address access coming from a remote host for example. The disclosed method, therefore, reduces power key performance indicators (KPIs) at a codec side for capture or playback by the amount of DSP compute power used to process the standard-based memory accesses, which is about 1 mW, or about 2% reduction in power consumption.

Since the full standard address is substantially reduced to determine memory addresses, this also reduces the required footprint size or Silicon area of the memory needed to perform the memory address determinations. The AMT table is scalable and configurable to save power and area with the runtime programmable address mapping. The added hardware, AMT, and WPB are much smaller than the memory size required for always using the virtual full standard addresses to convert to physical full memory addresses.

While the disclosed method and device are described with the example of audio SoundWire® device class devices and standards, it will be understood that the disclosed method is applicable to many different audio standards and can support control and/or bulk traffic access (BRA).

Referring now to FIG. 1A, an audio processing system 10 has modules or units, formed by, or operated by, hardware, software, and/or firmware as described herein, and has an audio function processing (AFP) device 22 that can provide audio processing for audio functions in compliance with audio function processing interface standards including an audio function processing device class standard, such as SoundWire® class for audio (SDCA) specifications as one possible example. The AFP device 22 may perform audio processing to assist one or more of the other units in the audio processing system 10. Thus, for example, processing system 10 may have one or more microphones 12, an input terminal 14, entities 16, output terminal 18, and source data port 20. The entities 16 can be any audio processing device, unit, or module such as units which modify the signal to apply gain to channels, provide complex processing, such as active noise cancellation (ANC) and so forth such as by mixer units that mixes audio signals such as equalizers, amplifiers, selector units that select audio function control settings such as volume, tone, and so forth. Other entities 16 may include auxiliary entities such as interrupt controllers, audio sample clocks, clock selectors, power domain controllers, and so forth. The input and output terminals 14 and 18, smart microphones, smart speakers, audio jacks with codec, sink and source data ports, and so forth also may be considered entities as well. Other non-audio devices such as environmental sensor systems that provide image or other context data used to analyze the audio signals also may be included as entities.

In these cases, audio waves are captured by microphones 12 for example, and then the audio is processed by using the AFP 22 to modify or refine the audio signals, or set audio parameters, of the audio at any of the units, 12, 14, 16, 18, and 20 mentioned herein. This will provide audio source data at an audio source data port 20 that can be used by further downstream audio processing applications.

Figure 1B:
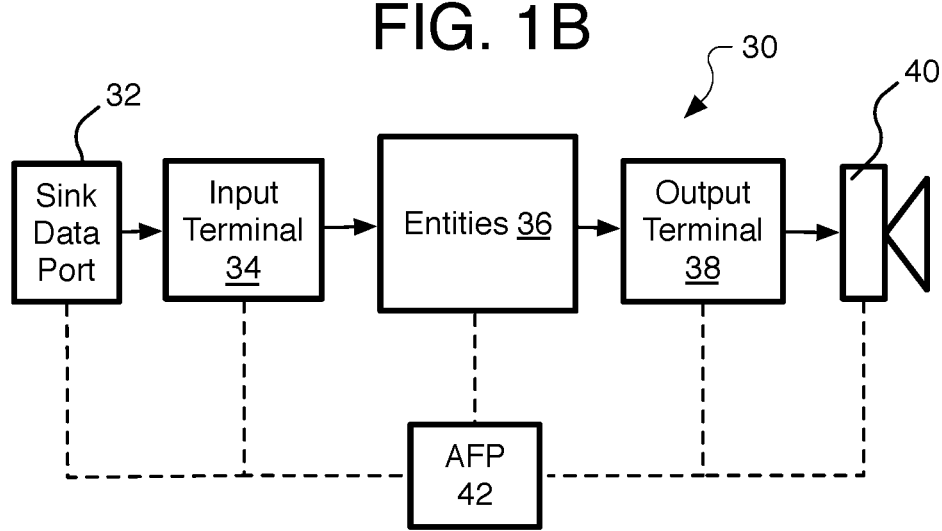
FIG. 1B is a schematic diagram of another example audio processing system according to at least one of the implementations described herein.

Referring to FIG. 1B, similar to audio processing system 10, an audio processing system 30 is shown and has similar units as system 10 except here data is obtained from a sink data port 32 rather than raw audio data obtained from microphones 12. The output audio in this case may be emitted by one or more speakers 40. Here also, the AFP device 22 may provide audio processing functionality for any of the other units of the system 30 to enhance the audio signals or to set audio parameters.

Referring now to FIG. 1C, an audio processing system 100 has an audio function processing (AFP) device 102 that is communicatively coupled to one or more main processors 104, one or more audio processing devices or entities 103, and a main memory 105. The main processor(s) may be an SoC that forms CPUs such as Meteor Lake (MTL) or Lunar Lake (LNL), for example, and may be considered an audio function processing host control. This may be or have the main general CPU of the entire device, such as a computer, laptop, or smartphone. By one form, the main processor, or host, 104 is in a base (or motherboard or keyboard side) of a laptop and is remote from the AFP device 102 residing in the display side of the laptop. The other audio entities 103 may or may not be partially software stored on main memory 105 or may have shared or fixed function hardware or firmware structure. The entities 103 may or may not be considered part of the AFP device 102.

The AFP device 102 may have or be an SoC, and may perform the audio function processing as with AFPs 22 (FIG. 1A) and 42 (FIG. 1B). The AFP device 102 may have an AFP device controller (AFC) 112 and an audio function device class (AFDC) control or unit (or just AFDC) 114. The AFC 112 and AFDC 114 may communicate through a multi-drop bus or other internal fabric 150 with one or more audio codec embedded chips or smart embedded audio machine learning unit(s) 108 companion chips, embedded DSPs 106, and a local (or on-chip or on-board) memory 110. The AFC 112 and AFDC 114 may communicate more directly with one another through a chip-communicating bus 152, such as an ARM-based advanced microcontroller bus architecture (AMBA) peripheral bus (APB) for SoCs. Other embedded devices may include post-processing for stream rendering. By one form, the bus 150 may provide access to a number of host ports such as four and for the audio function processing controller 112 and AFDC unit 114. The specification of the AFDC 114, such as the SDCA specification, may allow for in-box device driver development, and may involve frequent but asynchronous control or memory (audio streaming) access to a device. Other implementation accesses may be provided such as firmware downloads to one of the companion chips, or audio history buffer transfers, for example.

The AFC 112 may be arranged to handle a number of parameters and configurations and can handle three main use-cases including the capture of audio streams through one or more of the microphones. Related to the audio capture, the AFC 112 may provide pre-processing functions such as dynamic noise suppression (DNS), microphone-mute, volume control, channel and/or speaker selection, audio streams mixing, warning alarms for Internet of things (IoT) applications, and audio echo cancellation (AEC) to name a few examples. A second function handled by the AFC 112 may be stream rendering for speaker(s). Yet other functions handled by the AFC 112 may be smart-amplifier functions for integrated speakers, providing hi-fi output while maintaining and/or protecting the speakers.

The DSPs 106 may be fixed function DSPs for the audio function processing only, but could be shared to perform other audio-related processing tasks.

The audio machine learning unit 108 may operate neural networks with multiply-accumulate circuits (MACs) for example, and may be used to process many audio processing tasks such as external voice activity detection (eVAD), wake-on-voice (WoV) operations, automatic speech recognition (ASR) operations, speaker recognition (SR) operations, and so forth. By one example, the machine learning unit 108 may have, form, or use a gaussian and neural accelerator (GNA).

The memory 110 may be local, on-chip, or on-board memory on the same SoC or circuit board as the hardware of the AFP 102, AFC 112, and/or the AFDC 114. The memory 110 may be L2 cache for example, and may be the target memory for the reads and writes performed by the AFDC 114 described herein. The memory 110 may be a form of RAM, such as SRAM or DRAM, and may be DDR RAM.

The AFC (or referred to herein below as the AFP controller or just controller) 112 may have firmware 130 and hardware 132 that may be used to perform the audio function processing tasks disclosed herein when the AFDC 114 cannot perform the tasks, such as determining memory addresses, performing a read or a write, transmitting control settings, audio streaming data blocks, and/or other implementation data or instructions, implementing standard specifications, such as MIPI SoundWire® audio standards for example, and performing a variety of audio function processing whether modifying control values and/or performing audio signal modifications and refinements according to the controls and standards, and depending on which entity is involved. The firmware 130 may be operated by the CPU 104 in order to perform these tasks.

The audio function device class control (AFDC) unit 114 may be used to determine shortened memory addresses, perform reads, and initiate writes. The AFDC 114 also may be used to implement standard specifications, such as MIPI SoundWire® device class for audio standards for example, and perform a variety of audio function processing whether modifying control values and/or performing audio signal modifications and refinements according to the controls and standards, and depending on which entity is involved. By one example, the AFDC 114 usually performs functions such as receiving events or notifications from a remote host, and facilitating other status polling functions where remote hosts can read current or voltage information from the AFP, for example. It will be appreciated that the AFDC system could also apply to ultrasound, radar, Lidar, and so forth, instead of, or in addition to, audible audio waves.

To perform memory address conversions, the AFDC 114 may include an address decoder unit 116 that rearranges the incoming standard controller address from the controller 112, and this may include performing a swizzling operation. The AFDC 114 also may have an address mapping table (AMT) 118 and optionally a write pending buffer (WPB) 122 as well as corresponding AMT manager 120 and WPB manager 124 to manage the table and buffer, respectively. The AMT manager may have a look-up (LU) unit 126, a range (or range threshold) unit 128 to determine if the controller address is within a control or non-control address range, a combiner unit 136, and a read unit 142. The LU unit 126 uses bits, such as MSBs, from the rearranged address or the incoming address, to form a look-up with a small bit size. The look-up may be used to find bits, such as MSBs, of a memory address and on the AMT. The combiner unit 136 combines the looked-up bits from the AMT with corresponding bits, such as the lowest significant bits (LSBs) from the rearranged address or incoming address, to form a full memory address. The read unit 142 then may be used to perform a read on the local memory, such as a local cache memory, and at the location of the memory address in the memory 110. By one form, the combined output full memory address is the physical memory address of the memory 110.

The WPB manager 124 also may have a read-only/dirty bit unit 138 to monitor the address locations and which actions are permitted at the locations, a WPB write unit 140 to perform a write onto the WPB address spaces, and an interrupt unit 134 to control the timing of the writes to the memory 110 so that firmware at the AFC 112 that performs the writes is not continuously operated thus permitting the main processor 104 to sleep longer. The details of the operation of the managers 120 and 124, and fields in the AMT 118 and WPB 122 are described below.

Referring to FIG. 10, the an AFDC 114 may include, or be at least partially formed by, hardware (AFDCHW) 1000 with processor circuitry 1002 having, being, or being on, a system on a chip (SoC) and formed by one or more semiconductor chips. The AFDCHW 1000 may have one or more host controllers 1004 and an instruction unit (IU) 1006 that is a CPU (or chip set or cores). An execution unit (not shown) also may be provided. The instruction unit 1006 may provide instructions to the execution units to perform audio function processing tasks, such as to modify audio signals according to audio control settings and in compliance with an audio function processing standard as mentioned. The instruction unit 1006 also may have instructions to initiate reads or writes at the local memory and to do so by obtaining memory addresses to perform read or write accesses for control or command data, audio data streaming data, and/or implementation data.

The instruction unit 1006 operates the modules or units of the AMT manager 120 and WPB manager 124. This includes setting values in registers 1020 relevant to the read and write access performed by using the AMT 118. By the current example, one register stores the incoming controller address from the AFC unit 112, while other registers may indicate interrupts to interrupt the firmware of the AFC unit 112 in circumstances when the AMT 118 cannot be used, and as described below. By one form, the AFDCHW 1000 may have at least an interrupt enable register (xDyCTL1 or AFDC.xDyCTL1), an address hole interrupt register (xDySTS.AAHIS), and an incoming address (or controller address) register (xDyATM). Other registers that may be present include configuration registers that indicate the number of AMT and WPB entries, global control registers that indicate power, reset, and clock controls, as well as other generic registers such as controller or audio device controller registers.

The AFDCHW 1000 also may have various clocks 1010 to control timing of the communications, and a port 1016 to receive and transmit data to other chips, circuits, units, and/or modules such as the AFC 112. Otherwise, the AFDCHW 1000 also may have power and reset sequencer(s), other sensor subsystems such as a camera interface for image processing to integrate the functionality of audio and imaging.

In order to perform the read operation itself rather than awakening the firmware 130 at the AFC 112, the instruction unit 1006 converts the controller address from the AFC 112 and converts it into the physical memory address, via use of the AMT and as described herein, and then reads the memory such as system memory or cache. The read is simply a matter of sending the address from the instruction unit 1006 and a read control signal via the bus 150 and to the memory 110 for example. The memory 110 sends the contents of the address back to the instruction unit 1006. Other similar techniques may be used by the AFDCHW 1000 instead that do not require waking of the AFC firmware, AFP DSPs, and/or main CPUs of the AFP for example. In other words, a read is performed by the AFDC 114 via bus 150 to memory 110. The AMT entries are initially setup by the AFDCHW 1000 through the instruction unit 1006. A series of writes by the AFDC 114 are performed via bus 150 as well. The main CPU or firmware of the AFC unit 112 need not be involved. The instruction unit 1006 may be a microcontroller that executes series of instructions for either arithmetic operations or load and/or storage operations for read and write, and so forth.

It should be noted that while the DSPs 106, machine language unit 108, the memory 110, as well as the bus 150 are shown to be separate from the AFDC unit 114, one or more of these components may be considered to be, or may actually physically be, part of the AFDC 114, and in turn part of the AFDCHW 1000. Also, the architecture of the AFDC unit 114 is configurable based on an amount of functionality desired for the audio function processing hardware of the audio function device class unit or device 114.

Referring to FIG. 2, an example computer-implemented process 200 of audio function processing with reduced memory usage is provided. In the illustrated implementation, process 200 may include one or more operations, functions, or actions as illustrated by one or more of operations 202 to 210 numbered evenly. By way of non-limiting example, process 200 may be described with reference to example audio function processing devices described herein with any of FIGS. 1A-1C and 11-13, and where relevant.

Process 200 may include "receive a first address in a format of an audio function processing interface standard" 202. In other words, this operation is directed to receiving a controller address (or incoming address) at the AFDC, and that, by one example, is the first address and is in a format of the audio function processing standard, such as the 32 bit SoundWire® device class for audio 10 address. The address is received from the AFC and may accompany an instruction to read or write on the memory and at the controller address location. It should be noted that the AFDC also may generate the incoming address itself when performing audio functions that require such an action, such as burst addresses. By one form for a control message, the incoming address has bits that indicate a function, an entity, a control selection, a control number, and a number of other bit fields including spare fields that can be customized for use depending on the entity or other factors. Otherwise, the incoming message may have audio streaming data, or may have data for implementation of the AFDC or specific entities.

Process 200 may include "convert the first address into a memory address using an address mapping table" 204. By one form, the controller address, or here the first address, from the AFC is a virtual address to be converted into the physical address of the memory. The AMT performs this conversion.

Process 200 may include "use the first address to generate a look-up with a bit size set to reduce a number of memory address portions each of a different memory address available by using the address mapping table" 206. In other words, this operation reduces the total address range that is handled by the AMT, and the range may depend on the size of the look-up. For example, if the look-up is a maximum of 10 bits, only 1024 (or $2^{bits}$) possible different addresses can be available at the AMT. Thus, the total available range, depending on the number and size of function, entity, control-select, and control-number fields handled by the audio device, may be about 100 KB, by one example. In complex platforms where many audio endpoints exist, the available range may be even less. By one form, the look-up is less than half the size of the first address. By one form, the look-up is less than 22 bits. By one form, the look-up is 3 to 10 bits, and by another form, the look-up is 6 bits. By one form, the bit size of the look-up remains fixed but could change depending on a number of factors such as the size of the fields in the rearranged address.

In order to shorten the look-up and still obtain accurate memory addresses, the small look-up is generated by rearranging the first address when the first address has bits, such as MSBs, to show the first address is within a control address range. In this case, the incoming address may be rearranged by a decoder, such as by swizzling. By one form, the movement of bit locations is fixed for the swizzling, but could be dynamic based on the type of message or address. By one form, the incoming address typically has multiple separate bit fields for each of the function, entity, control selection, and control numbers, and the rearranging concatenates these categories back together so that there is one field for each category, and while dropping other fields, and by one form, dropping all other fields from the first address.

The MSBs, or other bits, of the rearranged address are then used as the look-up on the AMT to obtain memory address MSBs or other bits of the memory address listed or otherwise maintained on the AMT, or that can be computed using the AMT. The MSBs on the AMT, referred to herein as first bits, are then combined, such as by concatenating, with second bits from the rearranged address, such as LSBs, to form a full physical memory address.

By an alternative, when the incoming address has MSBs that are not within a control address range, the address may be for other non-control data such as audio streaming (memory block) or implementation data. In this case, the incoming address MSBs are then compared to a non-control address range. If the MSBs of the incoming address are within the non-control address range, then similar operations are performed except that MSBs of the incoming controller address are used directly as the look-up on the AMT. These MSBs can be different than the MSBs used for the control range experiment. Other bits, such as LSBs, of the first address are combined with the found MSBs of the memory address on the AMT to form the full memory address.

Process 200 may include "provide the memory address to perform a read or write to the memory address on a memory" 208. Here, the full memory address is a physical memory address used to perform a read or write. When a read is being performed, the AFDCHW may perform the read itself. When a write is being performed, the firmware of the AFC unit is awakened to perform the write. Optionally, when a write is being performed, process 200 may include "use a write pending buffer to manage writes" 210. In this case, the data to be written is written to a write pending buffer (WPB) instead of directly to the memory. After a number of writes are collected in the WPB, or after a predetermined duration, the firmware of the AFC is awakened to perform the writes so that the firmware can be kept in sleep modes for longer durations in order to reduce power consumption.

Figure 3:
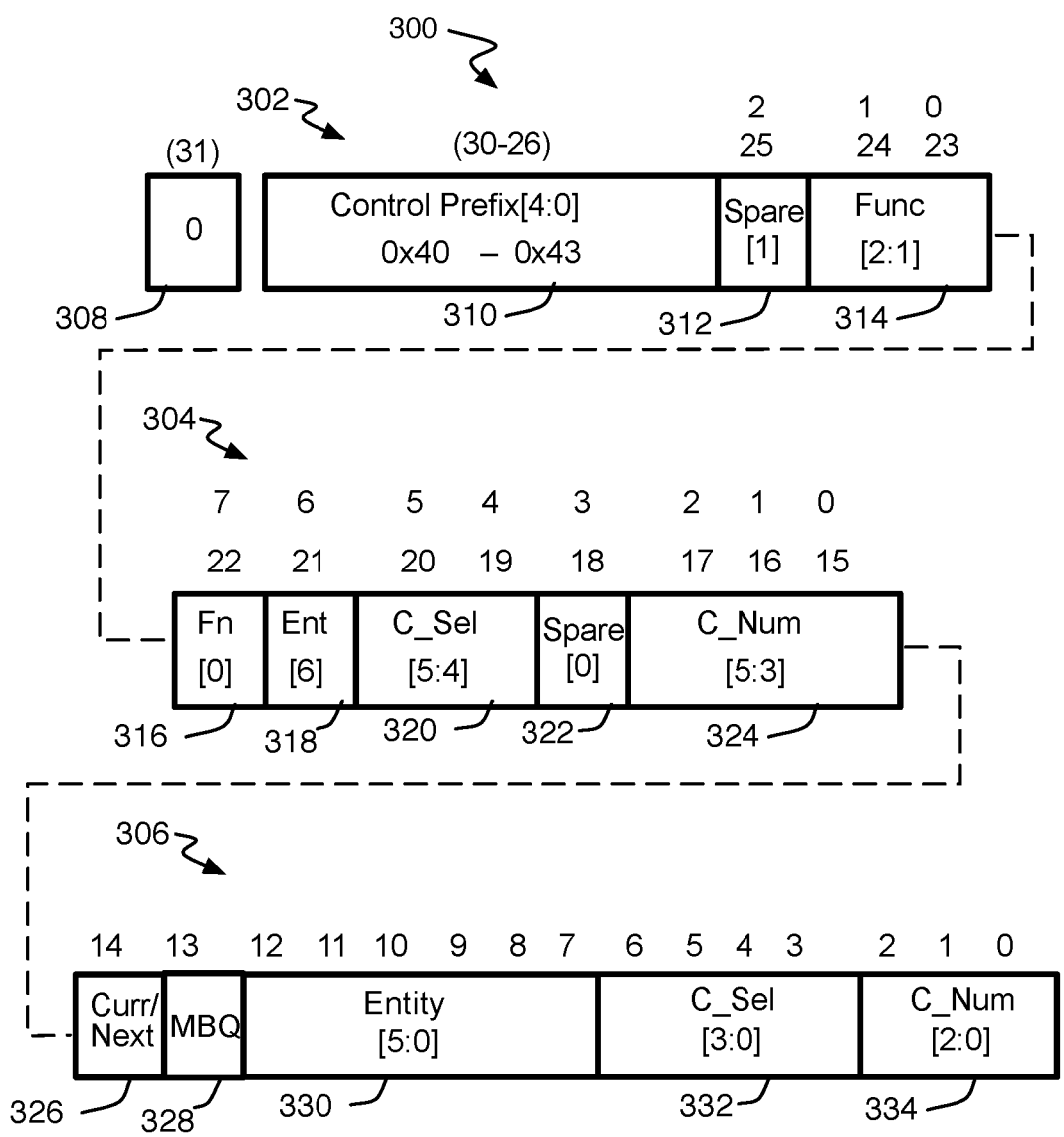
FIG. 3 is a schematic diagram of an example standard audio function processing interface control address according to at least one of the implementations described herein.

Referring now to FIG. 3, an example standard audio processing interface control indicator or address 300 is shown, and may be provided from the AFC as the incoming address or controller address. The controller address 300 may be in compliance with SoundWire® audio specifications, and device class for audio specifications. This is only one example format, and the controller address is not necessarily limited to a single format.

In this example, the controller address 300 has 32 bits numbered 0 to 31 (shown above the field) and has a first address indicator bit 308 tied to 0 and reserved or available for various uses, and then three main sections 302, 304, and 306 forming the controller address 300. The three sections are defined so that when devices are accessed with read and write commands, the three different sections 302, 304, and 306 may be provided from different standardized paging registers. The address bits are assigned to the hierarchical elements such that when software is accessing a number of controls within a typical device, the commonly changed fields are all within the lower 15 bits. This facilitates accessing registers for the AFDC controls with few or no updates to either the other paging registers. Specifically, the third section 306 holds 15 commonly used bits mapped to low-order bits provided by RegAddr[14:0] in read and write commands for this standard. The second section 304 holds eight rarely used bits mapped to high-order bits in SCP_AddrPage2 for this standard. The first section 302 holds three rarely used bits mapped to high-order bits in SCP_AddrPage1 according to the standard. The counting of these bits for each separate section is shown above the total 31 to 0 bit counting.

The first eight bit section 302 has a five bit control address prefix that indicates the address start according to the standard address ranges (see table 1 below). The hardware may check the first section 302 and ensure if the address is within the range of expected start and end addresses to allow the access. Any access outside of the standard address range may be generated as an interrupt to the DSP to handle the access as explained below. The first section 302 also has a one bit spare field 312 and a two bit function field. The bracketed range in the field shows the field sizes in bits and indicates the total bit count. Thus, for example spare field 312 has bit 1 while a second spare field 322 has bit 0 when counting the two bits together (or the two fields are concatenated). An eight bit second section 304 has a remainder function field 316, a first entity field 318, a first control selection field 320, the second spare field 322, and a control number field 324. The 15 bit third section provides a current/next field 326, a multi-byte quantities (MBQ) field 328, a second entity field 330, a second control selection field 332, and a second control number field 334.

This address structure 300 provides a hierarchical address, and for this example, the total function field (by concatenating the two function fields 314 and 316 in the address 300) can be up to eight audio functions within one device, e.g., a microphone or an amplifier. The total entity field (321 and 330) identifies one of up to 128 identifiable blocks (or entities) within the audio function signal path, e.g., a feature unit, a mixer unit, and so forth. The total control selector field (320 and 332) identifies one of up to 48 standardized, or 16 implementation-defined, parameters that can be adjusted within an entity, e.g., a volume control. The control number field (324 and 334) may provide one of up to 64 instances of a given type of control, e.g., for addressing mixer controls at each of the input/output channel crosspoints in a mixer unit. The current/next field 326 may be used to distinguish between addressing the current and next values in dual-ranked registers. The MBQ field 328 may be used to generate atomic accesses to multi-byte quantities which can be read or written one byte at a time. The spare fields 312 and 322 may be reserved for future expansion.

Alternatively, the controller address is being used to read or write part of a memory block, whether to read or write streaming audio data or to read or write implementation data. Particularly, an SDCA device may have one or more memory blocks, used for various purposes such as firmware in extension units, history buffers in smart microphone processing unit messages or universal message passing message buffers for several types of entities. This is implementation-defined. Each memory block is viewed as a simple array of bytes at consecutive addresses within the block. In the example standard being used here, the memory blocks can be addressed using the same register accesses (same three section size definition) as used for controls, including the same paging registers. Thus, the address here may be 32 bits as well and divided into three sections as mentioned for the control address. This may include bulk register access (BRA) for higher bandwidth access to memories, where a full 32-bit address is provided without any need for paging registers.

Figure 4A:
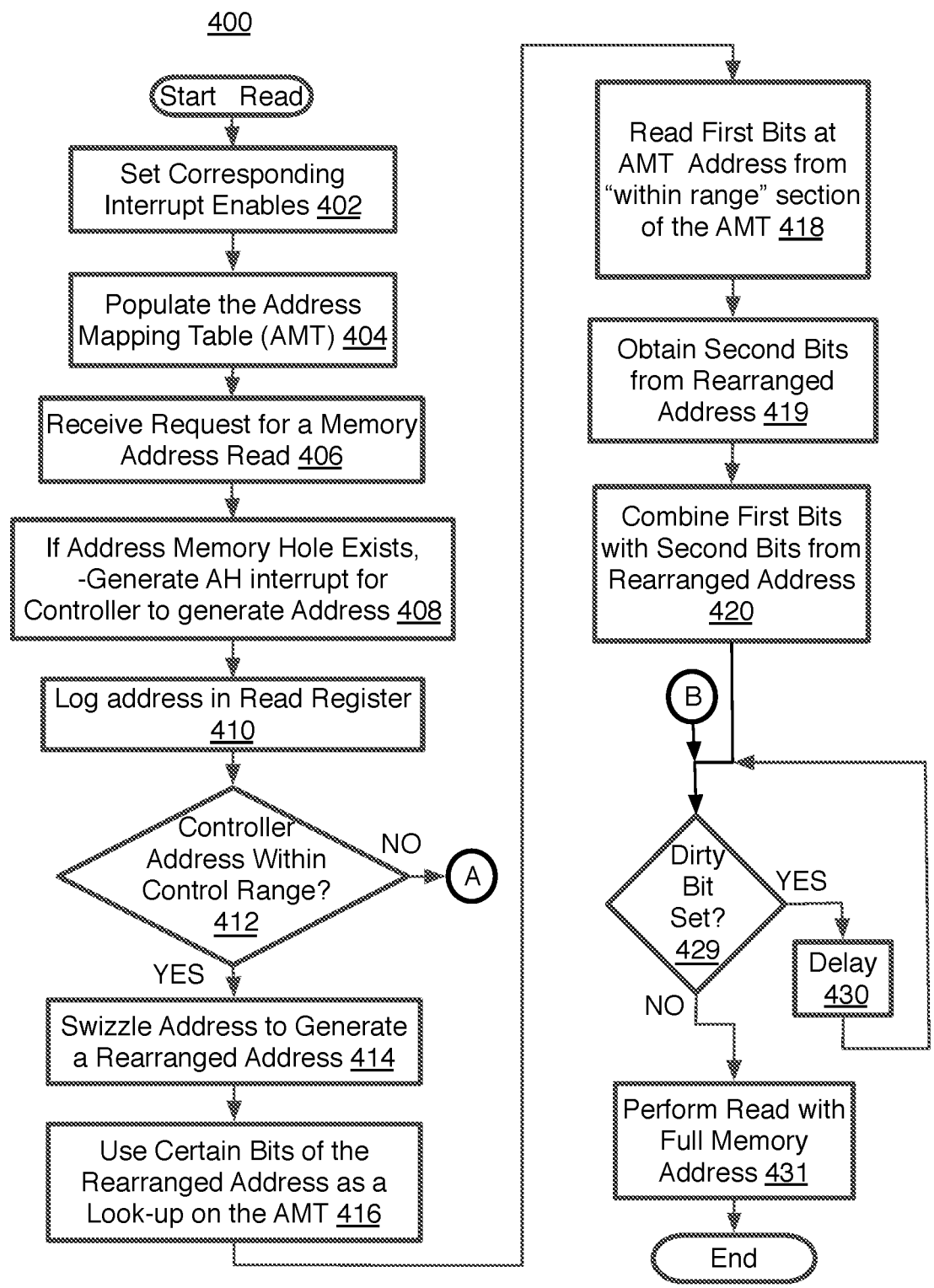
FIGS. 4A-4B is a detailed flow chart of an example audio function processing method performing a read with reduced memory usage according to at least one of the implementations described herein.
Figure 4B:
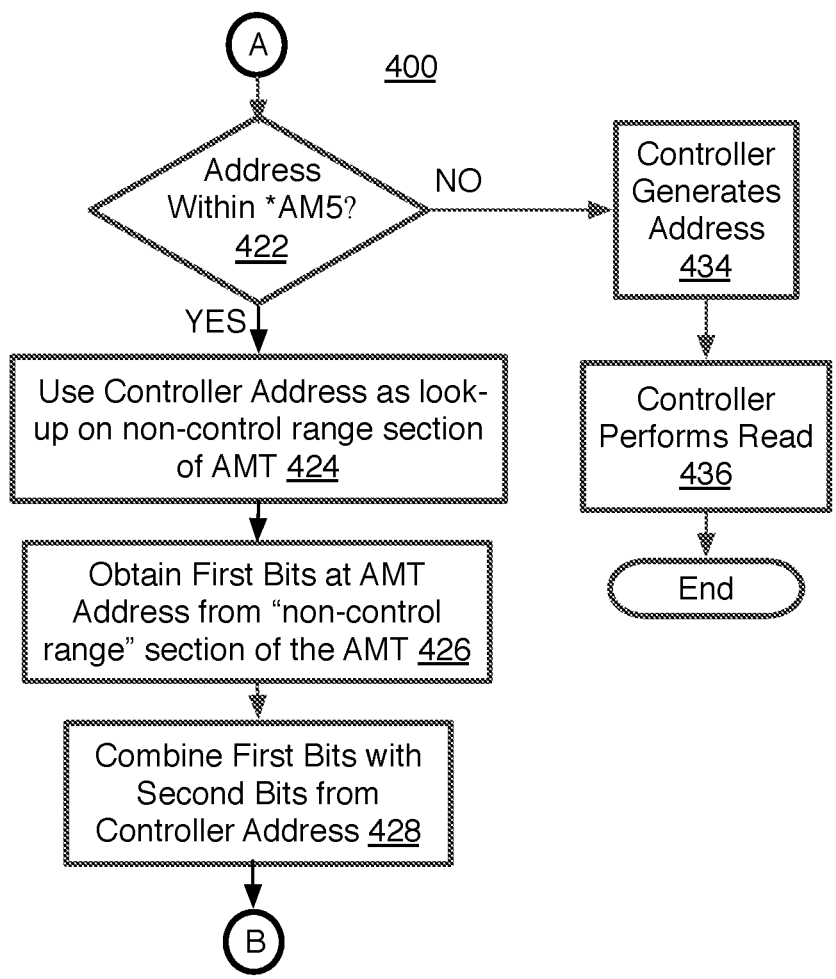
Figure 5:
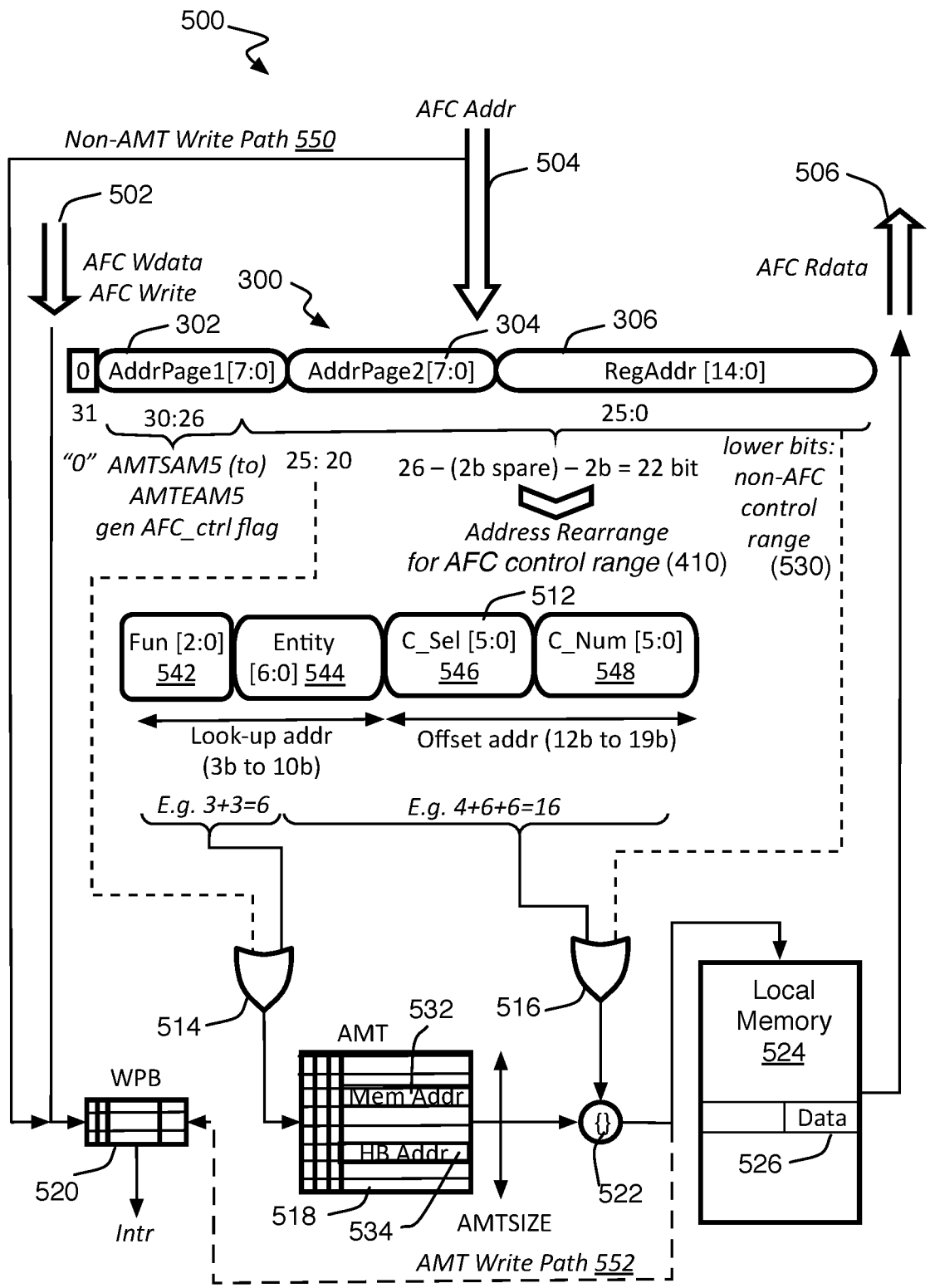
FIG. 5 is a schematic flow diagram of an example audio function processing method using an address mapping table according to at least one of the implementations described herein.

Referring to FIGS. 4A-4B, an example computer-implemented process 400 of audio function processing with reduced memory usage is provided, and particularly to perform a read access. In the illustrated implementation, process 400 may include one or more operations, functions, or actions as illustrated by one or more of operations 402 to 436 generally numbered evenly. By way of non-limiting example, process 400 may be described with reference to example audio function processing devices described herein with any of FIGS. 1A-1C and 11-13, and where relevant. Also, a process 500 (FIG. 5) shows the audio function processing described herein visually, and is referred to below in order to explain the process 400.

Figures 6, 7, 9:
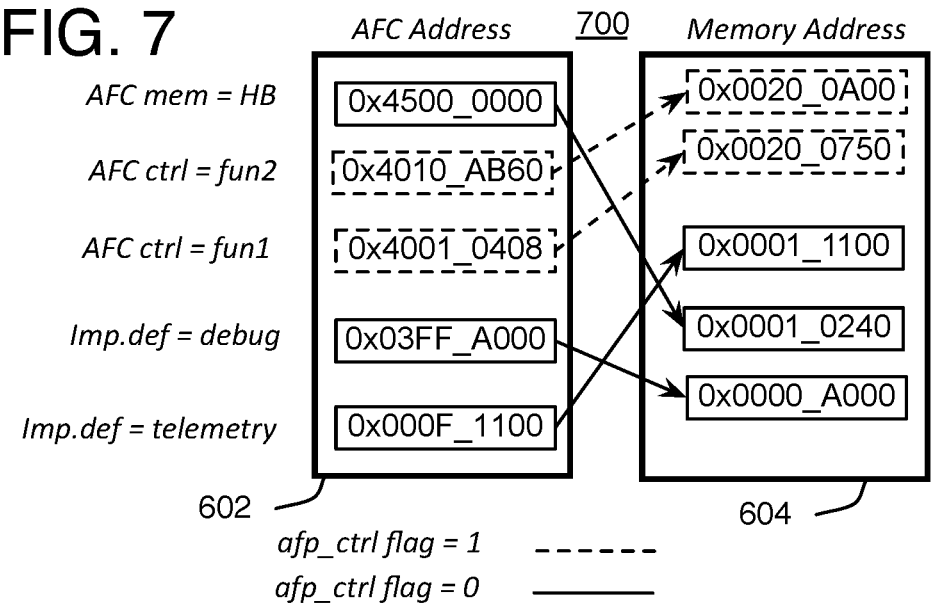
FIG. 6 is a schematic diagram of an example address mapping table according to at least one of the implementations described herein.
FIG. 7 is a schematic diagram showing an example operation of an address mapping table according to at least one of the implementations described herein.
FIG. 9 is a schematic diagram of an example write pending buffer according to at least one of the implementations described herein.

Referring to FIG. 6, process 400 may use an example address mapping table (AMT) 600 to perform the read accesses. The AMT 600 may have a memory address listing that corresponds the look-ups with the memory address portions. Each address field in an address row or entry line (or memory address portion or bits) also may have an enable bit (or flag), a read-only bit, and a dirty bit. The use of these fields are as follows:

Enable bit: This field indicates that the firmware of the AFC has enabled the entry for address mapping for a particular memory address to allocate or free-up corresponding address ranges of the AMT entries. By one example, this field can be used to enable whole memory address ranges on the AMT that are being handled by the AFDC for specific purposes, such as specific platform segments or particular controls, and so forth.

Read-only bit: This field indicates that the firmware of the AFC has enabled the entry for read only, and writes are ignored. This may be implemented to protect certain address ranges from being written over as required by a remote host for example. This may be used when the AFC is to request a write on a memory address field, as explained in greater detail below.

Dirty bit: This field indicates when there is a pending write for a specific entry (or row) of any address within the permitted address range, and prevents reads of old data in the entry with the pending write.

Memory Address: The depth of the AMT, which refers to the number of entries or memory addresses in (or represented by) the table is configurable as mentioned above, and may be limited by the number of bits in the look-up since the look-up must have a maximum number of available binary bit combinations. By one alternative, there is an option to separate the control access memory addresses from the other non-control (audio streaming and implementation specific) accesses into two different sections of the AMT 600. Each section may be used with a different look-up, such as look-ups with different lengths. By one form, there are 64 control entries (or rows) and 64 non-control entries (or rows) for 128 rows.

The size of each entry also is programmable for efficient memory management. The memory management may have efficiencies similar to CPU memory management except here tailored for TO accesses. Examples of the entry or memory address fields of the AMT are provided below.

The memory address fields are setup by the firmware of the AFC by listing the MSBs of the look-up and corresponding destination local physical memory address MSBs. Other alternatives include using bits of certain fields regardless of the bit position in the controller address or rearranged address. As mentioned, the look-up may have different bits depending on whether the controller address is associated with a control selection, a memory block (streaming audio data), or implementation data.

For the control range, the formula for an AMT memory address width for the portion of the memory address to be stored in the AMT is:

$$\text{AMT destination address width size (AMTDAWS)} = 32 - (22 - \text{AMTSAW}) \quad (1)$$

where AMTDAWS is the width of the physical memory address portion held in the AMT, where 32 denotes the local virtual memory address width of the local memory (or in other words, the width of the incoming controller address), 22 indicates the LSBs from the incoming controller address to be used to form the rearranged address, and AMTSAW is AMT source address width, or in other words, the bit size of the look-up from the rearranged address.

For the non-control range, the formula for AMT memory address width, $$\text{AMT destination address width output (AMTDAWO)} = 32 - (\text{max address range}) \quad (2)$$

where AMTDAWO is the width of the physical memory address portion held in the AMT, where 32 denotes the bits size of the virtual incoming controller address, and where max address range is the maximum number of bits available or empty in the memory map allocated in the DSP of the AFP system or device above that already consumed by the memory or implementation data. For example, if a history buffer (HB) range is 512 KB, then AMTDAWO=32-19=13 bits available for the AMT memory address portion because 19 bits will be consumed by the HB 512 KB of the address range ($2^9$=9 bits and $2^{10}$=10 bits, so 9+10=19 and 1 K*512=512 KB). This maximum range may be the total maximum range of all non-control ranges provided on the AMT when multiple ranges are provided for different types of data, such as additional audio streaming data range and firmware updating implementation range, for example.

Returning to process 400, the process 400 may include "set corresponding interrupt enables" 402. In this example, the firmware of the AFC sets interrupt enables in register xDyCTL1 on the AFDCHW 1000. Different from the enable bit in the AMT set above that enables the use of an AMT memory address or row in the AMT, here the firmware of the AFC enables the receipt of interrupts from the AFDC for AMT operation and to the firmware of the AFC. This may be performed once for the whole table or may be specific to certain memory address entries. The enabling of the interrupts is performed by setting an interrupt enable bit in the register. The enabling of the interrupts may be turned off even though an enable bit for a memory address is to be turned on because AMT enable bits may be dynamically managed by the firmware based on the memory availability, and so forth, while the DSP interrupt enable bits are mostly managed during start-up and are not changed in normal conditions. Otherwise, this can occur when conditions are not significant for the ADFC and AFC themselves, such as when a write access to read-only range is received. In this case, the firmware does not react since this is a remote host issue of incorrect flow.

Process 400 may include "populate the address mapping table (AMT)" 404. Here, the firmware of the AFC populates the AMT table according to the field definitions above, and by having the firmware of the AFC configuring the AMT table and registers. This may include setting the enable bits on the AMT as mentioned above to disable certain address ranges when needed.

Process 400 may include "receive request for a memory address read" 406. Here, the AFC (or device controller) initiates a read on a port to the AFDC unit by transmitting a controller address to be read. By one form, the AFDC also transmits a separate signal in the form of a flag, such as AFC_Write flag (502 on process 500 (FIG. 5)), where 1 indicates a write, and 0 indicates a read. As shown on process 500, the request for the read may be, or may accompany, transmission and receipt of an AFC addr (controller address) as shown by arrow 504 and at an input port of the AFDC.

Process 400 may include "if address memory hole exists, generate address hole interrupt for controller to generate address" 408. In this case, the AFDC determines if the controller address is within a maximum address range of expected memory values handled by the AMT. If not, a physical memory hole exists. By one form with address hole scenarios, the reads are dropped, and zeros are returned by the AFDC and to the AFC. An address hole interrupt register xDySTS.AAHIS is turned on or indicated for the corresponding received controller address. Once turned on, the AH interrupt is now pending and will remain on until the AH interrupt is transmitted to the AFC and the AFC performs the interrupt. When the AH register is indicated and the AH interrupt is pending, any future read or write for the corresponding incoming controller address cannot be performed.

Process 400 may include "log address in read register" 410, or in other words, the incoming register. According to the standard being followed, such as per MIPI protocol, the AFC controller provides the controller addresses within expected address ranges, and to be handled by the AFDCHW. By one form, the example standard memory address range is from <0x0000_2000 to 0x4800_0000> for 1.2 GB covering 64 control categories and 64 non-control categories. Table 1 below shows the standard memory address ranges from the controller addresses received form the AFC.

| Incoming Controller Address Range Table 1 | | | | |
|---|---|---|---|---|
| AFP Control | Start | End (exclusive) | | |
| 1 | 40000000 | 40100000 | | |
| 2 | 40100000 | 40200000 | | |
| ... | ... | ... | | |
| 63 | 43E00000 | 43F00000 | | |
| 64 | 43F00000 | 44000000 | — | |
| | | | Imp.def Range | |
| Memory | Start | End (exclusive) | Start | End (exclusive) |
| 1 | 44000000 | 44100000 | 002000 | 100000 |
| 2 | 44100000 | 44200000 | 100000 | 200000 |
| ... | ... | ... | ... | ... |
| 63 | 47E00000 | 47F00000 | 3E0000 | 3F0000 |
| 64 | 47F00000 | 48000000 | 3F0000 | 400000 |

For example, the control range may be from <0x40000000> to <44000000>, the non-control range memory (audio streaming data) range may be from <44000000> to <48000000>, while the non-control implementation range may be from <0x002000> to <0x4000000>. The table 1 lists the memory addresses in hexadecimal and Bytes.

Note that there is no address field definition for implementation specific access, and these are treated as directed addresses instead. This refers to permitting that address range to be used for any customized data flows such as firmware updates, history buffer transfers, sending non-audio data, e.g., sensor data, etc.

Process 500 shows the received controller address as the 32 bit controller address 300 (FIG. 3) with the three address paging sections 302, 304, and 306.

Process 400 may include the inquiry "controller address within control range?" 412, where bits from the controller address are compared to the range limits for a control indicator address from <0x40000000> to <44000000> mentioned in the above example. By one form, the bits form the controller address are MSBs of the controller address not including the first indicator bit [31]. The MSBs of the controller address 300 are shown as bits [30:26] with AMT start address MSB for 5 bits (AMTSAMS) to AMT end address MSB for 5 bits (AMTEAMS) on process 500. If the MSBs [30:26] falls within the standard-defined, or other desired, control range, then the controller address is passed through to be rearranged before being used with the AMT. This determination also may set an AFDC flag (to 1 for example) and referred to herein as afp_ctrl flag that may be set at the AFDCHW. The AFDC then uses the upper half control entries of the AMT table as shown on AMT 600. The non-control operation is explained below.

For a control address, process 400 then may include "swizzle address to generate a rearranged address" 414. Here, the incoming controller address is swizzled as per settings on the AFDC. As shown on process 500 as one example, the controller address 300 is shown where 26 [25:0] bits except for the control prefix bits are obtained for the swizzling. In this example, the two spare bits are dropped. Fields other than the function, entity, control selection, and control number fields may be dropped as well, such as the Current/next field and MBQ field. The remaining fields are united by category so that only one field exists for each of the function field 542, entity field 544, control selection 546, and control number field 548. The resulting rearranged address 512 has 22 bits and maintains the function, entity, control selection, and control number fields generally in the same order from the controller address 300.

Process 400 may include "use certain bits of the rearranged address as a look-up on the AMT" 416. By one form, the MSBs of the rearranged address are used as the look-up for the AMT. In one example, this includes the three to 10 most significant bits of the rearranged address. By one form, 6 bits are used as the look-up. For example, process 500 demonstrates an example of this operation as forming a look-up with 3 MSBs from the function field 542 and 3 MSBs being the first three bits from the entity field 544 for a total of a 6 bit look-up to find the corresponding memory address portion (or first bits) on the AMT 518. Thus, the look-up may be formed only from the function and entity fields 542 and 544 in the rearranged address 512, but other variations could be used, such as fixing the number of bits of the look-up to include some of the bits of the control selection field 546 for example. Also, the look-up does not need to include all of the function or entity field bits. In the example of process 500, the look-up is formed from three bits of the function field and the next three bits of the entity field, even though this is less than all of the bits in the entity field. The look-up bits from the arranged address can be many different combinations of the MSBs of the rearranged address, such as a certain number of MSBs of one or more individual fields, and so forth.

Process 400 may include "read first bits at AMT address from "within range" section of the AMT" 418. In this operation, the look-up is obtained by the AMT (or more precisely, AMT manager) via an OR gate 514 to represent the alternative operation with non-control addresses explained below. A physical OR gate may or may not actually be used. Otherwise, the gate may be implemented by firmware or software operations instead when not using the hardware alone. Then, the look-up obtained from the rearranged address is used to search the control address section of the AMT (such as in the look-up column in AMT 600 (FIG. 6)) to find a matching look-up with the same bit values (which also may be referred to as the look-up address, search term, look-up word, or look-up number). When the look-up is found on the AMT in the look-up column of AMT 600, the corresponding memory address portion in the MSBs column in AMT 600 is read from the AMT (which may be referred to as first bits of the full memory address). By one form, the memory address portion will be the MSBs of the full memory address when constructed.

Process 400 may include "obtain second bits from rearranged address" 419. By one form, the memory address portion is the LSBs from the rearranged address that were not already used for the look-up address and when the controller address is for a control. Thus, by the example in process 500, the second bits are all or some of the remaining bits form the rearranged address 512, also referred to as the offset address. By this example, the second bits include the four remaining bits of the entity field 544, the six bits from the control selection (C_Sel) field 546 and the six bits for the control number (C_Num) field 548 for a total of 16 LSBs when the look-up is 6 bits of the rearranged address 512. Other sizes or variations of the rearranged address bits could be used. The second bits from the rearranged address 512 also may be obtained via an OR gate 516 to alternatively use second bits from a non-control controller address 300 instead, and as explained below.

Process 400 may include "combine first bits with second bits from rearranged address" 420. For this operation for example, process 500 has a combiner 522 to combine the remaining LSB bits (e.g., 16 bits) from the rearranged address 512 with 16 MSB bits of the memory address portion (or first bits) from the AMT table 518 to form a full physical memory address with 16+16=32 bits for the full memory address. The combining may be performed by concatenating the first and second bits, but other operations could be used such as adding an offset to the incoming address, multiplying the incoming address by 2, 4, 8, etc. by shifting the bits to the left, and/or dividing the incoming address by shifting the address to the right.

Any time after the look-up is found on the AMT (in the "Look-up" column on AMT 600 for example), the dirty bit may be checked 429 to determine if a pending write is using the address. This may be performed after any of the operations building the remaining sections of the full memory address (operations 416 to 420 and/or 422 to 428) after the look-up is found 416 on the AMT but before the read is actually commenced in operation 431 so that old out-of-date data is not obtained from the memory. The dirty bit check 429 may be performed immediately after the look-up is found 416 to avoid the further address building operations in case the read is dropped to thereby avoid wasted processing. The dirty bit check 429 is shown here after the memory address is built simply as an available option and for convenience to avoid confusion with the control and non-control flows.

When the dirty bit is set on the AMT for the current memory address (or look-up) being handled, process 400 is delayed 430 and the dirty bit is rechecked until it is cleared. Otherwise, the process 400 proceeds to perform the read of the memory.

Thus, process 400 may include "perform read with full memory address" 431. The AFDC read access itself may be fully hardware managed by the AFDCHW. Thus, the AFDCHW may perform the read locally by transmitting the full memory address to the local memory, via bus for example, where a memory or cache manger retrieves the data from the location on the memory corresponding to the full memory address, and transmits the data, via bus for example, back to the AFC and/or AFDC, for further use. Process 500 shows the read operation by having a local memory 524 receive the full memory address. The address location from the full memory address is looked up, and the data 526 at the corresponding address field is read by placing a copy of the data (AFC Rdata) 506 on a bus for transmission back to the AFC or AFDC (or other component of the audio system that needs the data).

Returning to the control determination of operation 412, when the MSBs of the controller address is not within the control range, then this determination may set the afp_ctrl flag to zero at the AFDCHW, and proceed with an inquiry "address within *AM5?" 422. Here, the system is determining whether the MSBs of the controller address (such as the bits [30:26] as mentioned above) are within the non-control range of addresses. Thus, this operation determines whether bits AMTSAMS to AMTEAMS are within the example non-control controller address range of <0x002000> to <0x4000000> or <44000000> to <48000000>, for example. If the MSBs are within the non-control range, then the address rearranging logic is bypassed, and bits form the controller address 300 are used directly instead.

In this case, process 400 may include "use controller address as look-up on non-control range section of AMT" 424. Thus, by one form, after a first set of bits, such as the MSBs of the controller address, such as bits [31:26] of the non-control controller address, are used to determine the type of address (control or non-control), a second set of bits, such as the next n-MSBs of the non-control controller address adjacent the first set of bits, are used as the look-up to determine the first bits of the memory address on the AMT. In the example of process 500, the next MSBs of the non-control controller address are bits 25:20 to maintain a six bit non-control look-up. As shown by the dashed line, the look-up is provided to the AMT 518 via OR gate 514 instead of a control look-up.

Process 400 may include "obtain first bits at AMT address from "non-control range" section of the AMT" 426. Here, the non-control look-up is used to determine a corresponding memory address portion, such as MSBs, of the memory address as the first bits of the memory address. Otherwise, the look-up process is the same as the control look-up process in operation 418. It should be noted that the non-control controller address is not limited to the three paging sections 302, 304, and 306, and may have a different structure. Thus, in the example of process 500, the first bits forming the memory address portion in the AMT and corresponding to the non-control look-up may be 13 bits in this example.

Process 400 may include "combine first bits with second bits from controller address" 428. In the present example, the LSB bits (19 bits) of the controller address is obtained as shown by the dashed lines and via OR gate 516. Nineteen bits is simply a desired amount of the LSBs when a maximum of 20 bits was available in the controller address. By the example of process 500, the controller address is an HB address 534 for history buffer data of 512K, and the corresponding address memory portion (or second bits) is found in the non-control section of the AMT 518 (or 600). The combiner 522 then concatenates, or otherwise combines, the MSB bits of the memory address portion from the AMT to the LSBs from the controller address to form the physical full memory address (for 13+19=32 bits).

Referring to FIG. 7, example AMT mapping 700 shows the mapping of the AFC controller addresses 702 into the resulting physical full memory addresses 704 of the local memory being used. The dashed arrows show the AMT address conversion for a control section of the AMT (see FIG. 6) where the original address relates to control indicators such as AFC.ctrl=fun1 and AFC.ctrl=fun2 that relate to addresses that indicate controls for functions 1 and 2, respectively. For the control section, an afp_ctrl flag=1 to indicate the control section on the AMT is involved. Similarly, the solid arrows show AMT address conversion for the non-control section of the AMT (see FIG. 6). Here, memory (or audio streaming data) indicators provide an address for AFC mem=HB refers to a memory block of history buffer (HB) data. Non-control implementation related addresses imp.def=debug may provide upgrading for firmware data related to debugging, and imp.def=telemetry may provide upgrading firmware data related to telemetry such as statistics collection and transmission. For the non-control section, an afp_ctrl flag=0 to indicate the non-control section on the AMT is involved, as mentioned above. The flag is status information that may be represented in the form of a signal. This may be set on the AFDCHW.

Thereafter, the non-control memory address is provided for a read access as already described above with operation 430.

Returning to operation 422, when the MSBs of the controller address is not within either the expected control address range or the expected non-control address ranges, there may be an error, or a different type of address may be desired. In this case, when the AFDCHW is not permitted to generate the address, or does not have sufficient data to generate the address, for the range-related reasons, or any other reason, then process 400 may include "controller generates address" 434. Here, the AFC may confirm both the read access is desired and the target read address. The AFC then may generate the memory address itself by waking a main processor to operate the AFC firmware for example. Thereafter, process 400 may include "controller performs read" 436 where the AFC performs the read itself similar to the read performed by the AFDCHW described above.

Referring to FIGS. 8A-8B, an example computer-implemented process 800 of audio function processing is provided, and particularly to perform a write access. In the illustrated implementation, process 800 may include one or more operations, functions, or actions as illustrated by one or more of operations 802 to 848 generally numbered evenly. By way of non-limiting example, process 800 may be described with reference to example audio function processing devices described herein with any of FIGS. 1A-1C and 11-13, and where relevant. The process 500 (FIG. 5) also may be referenced to explain the write access process 800.

As a preliminary matter for the write accesses, either the controller addresses from the AFC are used directly to collect write data at the WPB or the audio function processing devices and systems convert or translate the controller addresses into full memory addresses by using the AMT as described with the read accesses and to use the full memory addresses to collect the writes at the WPB. By one form, the audio function processing system uses one strategy or the other depending on the system architecture, but an option to use both on one device or system could be provided as well. As mentioned, the use of the AMT will reduce power consumption and required memory capacity (or usage). During low-power modes, however, such measures may be unnecessary when the number of writes is relatively small, and flexibility provided by a larger memory address range, versus that provided by the AMT, is a higher priority.

Process 800 may include "set corresponding interrupt enables" 802, and this is the same as the read operation 402 where firmware of the AFC sets corresponding interrupt enables in register xDyCTL1 for each single address, groups of addresses, and/or the whole AMT.

Process 800 may include "populate the address mapping table (AMT)" 804. When the full memory addresses are to be used as the write address, the AMT is populated for the address conversions. The firmware also can choose to disable address ranges by using the enable bits in the AMT.

When either the AMT full memory addresses are being used, or the controller addresses are being used directly, to write to the WPB, the firmware of the AFC may populate the AMT table as per field definitions as described above. Thus, in one optional form, the AMT is filled and used to form full memory addresses in parallel to the write being performed with the controller address in order to maintain the AMT and WPB in synchronicity. Specifically, when the AMT is run in parallel to using the controller addresses as the write addresses, then the dirty bits of the AMT can still be used to stop premature reads of old out-of-date data when the system is still performing a write (or a write is pending). Thus, the synchronicity between AMT and WPB allows the system to perform a write using the controller address directly while setting dirty bits in the full memory address "domain" with the AMT. This then can stop the premature reads that use the AMT to convert the controller addresses to the full memory addresses as described above with read process 400.

Process 800 may include "receive request for a memory address write" 806. On AFDC write access, the AFC (or device controller) initiates a write on a bus port to the AFDC for example. The write request is shown as AFC Write along with the data being written as AFC WData (502 on FIG. 5).

Process 800 may include "if address memory hole exists, generate AH interrupt" 808. Similar to the read operation, this also triggers the AFDC to drop (or ignore) the write request and generate an address hole interrupt at register xDySTS.AAHIS at the AFDCHW to send the interrupt message to the AFC so that the AFC can perform the write itself instead of the AFDC.

When no address hole is present, process 800 may include "log address in write register" 810. Here, the incoming controller write address (AFC Addr 504 on FIG. 5) is logged in the incoming address register xDyATM. By one form, this register is not overwritten if an earlier address hole interrupt is pending for a previous write request. Once the interrupt is complete, then register can be over-written.

When the controller address is being used directly by the WPB (as shown by non-AMT write path 550 on process 500 (FIG. 5)), process 800 may include "write to free entry in WPB" 822. The AFDC handles writes directly to a write pending buffer (WPB) before the firmware of the AFC obtains the writes from the WPB and performs the writes to the target or local memory. The WPB may be stored on small local flip-flop storage units. It need not be part of system memory, and it may reside in the same design unit as the AFDC.

Referring to FIG. 9, an example WPB 900 has multiple memory address (or entity) lines each with a different row and each line having four fields including a write interrupt field, a multi-write field, a data field, and a memory address field. The number of entries may be configurable and predetermined. As mentioned, the WPB permits the collecting of the writes to better control the timing of the writes, such as after a certain number of write requests or at certain time intervals, to permit the CPU operating the firmware or DSPs to sleep longer in order to save more power. However, the AFDC write access is performed relatively immediately in the WPB 900 after receiving a write request since it can be locally performed. A next free entry in the WPB 900 is populated with write information as described for the fields of the WPB as follows.

Interrupt: The firmware of the AFC sets the write interrupt field on the WPB at the AFDC and indicates when a write interrupt is permitted to be transmitted to the firmware of the AFC to perform a write from a certain memory address on the WPB. This acts as an occupied flag for the AFDCHW. The writes with an interrupt occupied (or on) in the interrupt field are similar to the read-only attributes in the AMT entries, and the memory address of any write should have a dirty bit in the corresponding AMT entry. The firmware of the AFC processes the WPB entries in an ascending order of entries down the WPB rows, and clears the interrupt bit of each row once the write is finished. When all entries of the WPB are occupied with previously written data, subsequent write accesses are dropped, and a WPB full interrupt is generated to the firmware of the AFC.

Multi-write: This field is set by the AFDC and indicates one or more writes were received for the same memory address location while a corresponding write interrupt is still being performed for a previous or first write for the memory address. This should not be common and indicates the firmware of the AFC is over-subscribed. In this case, the AFC firmware did not process the WPB in time before a next frame or BRA was received. Note the multi-write status may be indicated to the firmware of the AFC, and the latest write attributes are updated for the write entry on the WPB.

Data: This field is the data to be written for the entry, and may be 8 bits or more by one example.

Address: This field may be either the controller address or the full memory address as determined by using the AMT. By one form, the address field is the first memory address for an entry and cannot be over-written. By one form, the address fields include the entire controller address, and by other forms, include the full memory addresses and include the possible LSBs from either the controller address or the rearranged address of both. By another approach as mentioned above, the entries or addresses are listed on the WPB as the writes are received and are not in order by address as with the AMT.

Continuing with process 800, the operation 822 to perform the write to the WPB may include "set interrupt" 824, where the interrupt bit is set in the interrupt field in the WPB. As part of setting the interrupt field in the WPB, process 800 may include "generate interrupt at FW" 826, which generates a WPB interrupt to the firmware of the AFC. By other forms, the interrupt is delayed until multiple writes are ready to be performed. Thus, the interrupt may be sent after a certain number of writes from the WPB are ready, or by some set time interval for example. As one approach, the moderation of the write timing may be programmable via a register by limiting the intervals to a number of writes for example. In this case, the maximum number of writes may be tied to the depth of the AMT entries or look-ups. For example, if the look-up register is 8 bits deep, then a single look-up register can be used to count the writes to interrupt on intervals and by setting a single bit with each incoming write. So if the maximum number of bits in a look-up register is 8, then 8 writes can be collected before interrupting the AFC and performing the writes. The register for the write count may be located at other registers, such as xDyCTL2 for example. Many variations are possible.

For this example with the controller address, process 500 (FIG. 5) represents at least this much of the write operations by showing a WPB 520 that receives the write data AFC Wdata and write request AFC Write 502. A write address AFC Addr 504 is received directly via a bus pathway for example, and from the AFC as shown by non-AMT write path 550 as mentioned. An interrupt (Intr) is generated by using the controller address as the write address directly in the WPB.

Process 800 may include "set multi-write data" 828. Here, the WPB logic, or WPB manager operating the logic, may independently check the incoming addresses with addresses of the already occupied entries. When an address of a current write is matched to an address of an older write, the AFDC sets the multi-write field as an address match.

Process 800 next may include "write address" 830, where the full memory address from the AMT processing is written to the entry line in the WPB and with the corresponding write data.

Process 800 may include "process WPB interrupt" 832. Here, the firmware processes the WPB interrupt. Thus, a CPU is either awakened or pauses on current operations to operate the firmware of the AFC to perform the write to the local memory.

Process 800 may include "update data in memory" 834. This includes having the firmware (or CPU) perform the write by updating corresponding entries in the local memory address (such as SRAM cache) at the memory address location.

Process 800 may include "clear WPB interrupt" 836. Once the write is complete for a WPB entry, the firmware of the AFC will clear the interrupt field of the WPB entry. The process is then repeated for each received write request. Clearing of the dirty bit is used when the write addresses are the full memory addresses generated by using the AMTs and is described below.

Turning to operation 812, and as mentioned above, when either the write address is to be the full memory address generated by the using the AMT, or the write address is the controller address and the AMT is to be operated in parallel to maintain AMT-WPB synchronicity, the system may convert the controller address AFC Addr 504 to the full memory address by performing the rearranging and by operating the AMT as described with the read operations. In either of these case, the incoming write controller address is then processed the same or similar to the read process 400 (shown here as an option in dashed line). Thus, process 800 may include the inquiry "controller address within control range?" 812. If the MSB bits of the controller address fall within the control range, the controller address is passed through address rearranging logic as with the read access operations. Thus, process 800 may include "swizzle address to generate a rearranged address" 814, and "use certain bits of the rearranged address as a look-up on the AMT" 816. The MSB (e.g., 6 bits) of the rearranged address is then used as the look-up on the AMT.

Once the full memory address is generated, then the operations may proceed with checking the read-only bit at operation 818. This may be required for the full memory address as write address and may be optional as an extra precaution when using the controller address as the write address instead. In the latter case, the AFC may handle all read-only designations itself. Here, process 800 next may include the inquiry "read-only?" 818 where a read-only bit or flag is checked on the AMT for the particular look-up. The read-only may be 'on' while the data of the current memory address (entry or entry line) just found with the look-up is being written to, read, or already has a pending read or write. This also may occur when an address line is read-only because it has a protected control field, such as a device ID or manufacturer ID that should not be changed frequently, if at all. If an entry is marked as read-only on the AMT, then the write is ignored and process 800 may include "controller performs write" 840, and the write may be performed without the use of the WPB. Here, the write may be delayed, and then directly completed by the AFC instead.

When the read-only bit or flag is not set on the AMT, process 800 may include "set dirty bit in AMT" 820. If there is no pending access to the selected entry, the dirty field in the AMT, if one exists for that entry (or look-up), is set to yes or on (such as by a binary bit) to indicate a write is pending or being performed for that entry or look-up. This field may be set by the AFDCHW. It will be understood that the same look-up and corresponding MSBs of a memory address could have multiple different LSBs, and in turn, be related to multiple full memory addresses. Thus, it is possible to receive a new write request for a look-up that already has a dirty bit and is being processed for a write access. Here, the dirty field already may be set on the AMT for multi-write scenarios. In this case, the AFDC may delay the new write. In some cases, the DSP may be used to determine which new write(s) to perform. For example, the DSP may be used to determine whether to update the data with the latest write(s) and drop the stale earlier pending writes. In some cases, the DSP may be used to process all writes and manage how to perform a final write value update. When a subsequent read is requested for the dirty entry, then the read is ignored, and zeros are returned as the data to the AFC. Otherwise, this condition need not be separately notified to the firmware of the AFC for a read access. As a result, when the controller address is being used directly as the write address, and assuming the DSP has not processed the WPB yet and a dirty bit exists for the current address to indicate the read data is not ready yet, then the read still will be delayed even though the controller address is the write address.

In the situation where the full memory address, as obtained after the combiner 522 (FIG. 5), is written to the WPB (as shown by AMT write address path 550), rather than using the controller address directly, the operations to perform the write and manage the interrupts is the same as operations 822 to 836 described above. Thus, an interrupt (Intr) from the WPB is generated in this case by using the full memory address (including LSBs from the controller address or rearranged address).

Thereafter, when either the write address is the controller address and the AMT is being run in parallel, or the write address is the full memory address from the AMT, then process 800 may include "clear dirty bit in AMT table" 838, where the dirty bit also is cleared by the firmware of the AFC upon acting on the WPB interrupt or once the write is complete. Any back-to-back write access to the same address while the firmware is processing the corresponding entries are undefined.

Returning to the control inquiry (812) and when the write controller address is not within the control range, process 800 may include the inquiry "address within *AM5?" 842 which refers to the non-control range mentioned above with the read operations. Thus, If the address ([30:26] for example in process 500) is within the non-control range, then the address rearranging logic is bypassed. In this case, as with the read access, a second set of MSBs (or other bits) of the controller address are used 844 as the look-up in the AMT, and the operations return to the read-only inquiry (818) to perform the check of the read-only field on the AMT and the subsequent write operations 820 to 838.

When the controller address is not within both the control and non-control address ranges, process 800 may include "generate address by controller" 846 and "perform write by controller" 848, where the AFC performs the address determination and write itself rather than the AFDC. The process is repeated for each of the writes.

It will be appreciated that processes 200, 400, 500, and/or 800 may be provided by example audio processing systems 10, 30, 100 and/or 1100 to operate at least some implementations of the present disclosure. This may include operation of the AMTs 600 or 700, and WPBs 900 by example hardware 1000 (FIG. 10).

In addition, any one or more of the operations of the processes in FIG. 1A-1C, 2, 4A-4B, 5, or 8A-8B not already specified as hardware may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware," as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware," as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

The terms "circuit" or "circuitry," as used in any implementation herein, may comprise or form, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof that form the circuits, circuitry, processor circuitry.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 11:
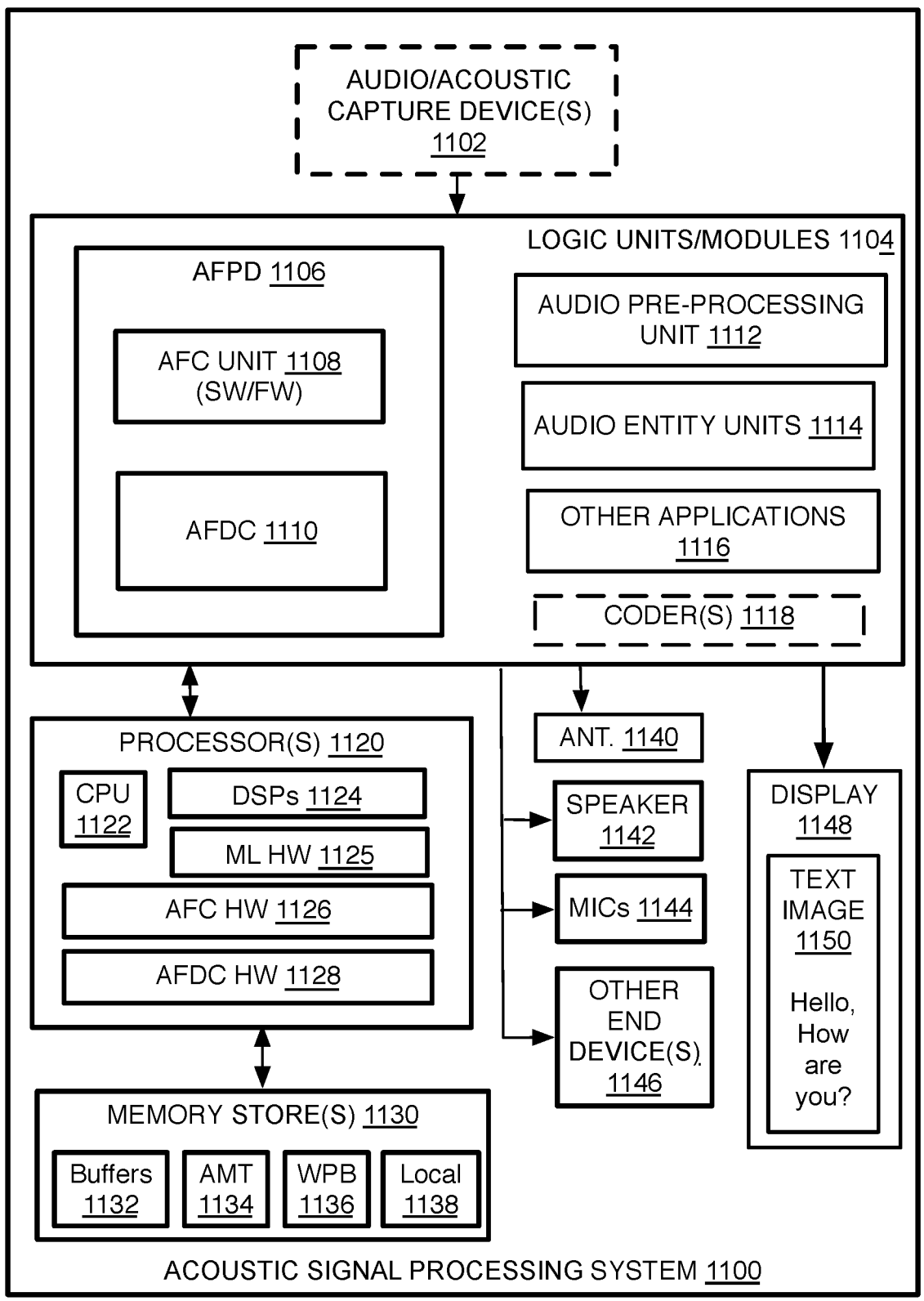
FIG. 11 is a schematic diagram of an example audio processing system or device.

Referring to FIG. 11, an example acoustic signal processing system or device 1100 is arranged in accordance with at least some implementations of the present disclosure. In various implementations, the example acoustic signal processing may be on, or may be part of, devices that are specific to certain entities mentioned above. Thus, for example, the example acoustic signal processing system 1100 may have or be an audio/acoustic capture device(s) 1102 to form or receive acoustical signal data. This can be implemented in many ways. Thus, in one form, the acoustic signal processing system 1100 is a device, or is on a device, with one or more microphones (or is a microphone). In other examples, the acoustic signal processing system 1100 may be in communication with a network of microphones, and may be remote from these acoustic signal capture devices such that logic modules 1104 may communicate remotely with, or otherwise may be communicatively coupled to, the microphones for further processing of the acoustic data.

In either case, such technology may include small mobile devices such as a telephone, a smart phone, a dictation machine, other sound recording machines, a mobile device or an on-board device, internet of things (IoT) devices, or any combination of these that stores a relatively small amount of power. Other devices that can be the acoustic signal processing device 1100 may include any computer or computing device, such as desktops, laptops, servers, tablets, computer networks with such equipment, and so forth. Thus, in one form, audio capture device 1102 may include audio capture hardware including one or more sensors as well as actuator controls. These controls may be part of a sensor module or component for operating the sensor. The sensor component may be part of the audio capture device 1102, or may be part of the logical modules 1104 or both. Such sensor component can be used to convert sound waves into an electrical acoustic signal. The audio capture device 1102 also may have an A/D converter, other filters, and so forth to provide a digital signal for acoustic signal processing.

In the illustrated example, the logic modules 1104 may include an audio function processing device unit 1106 that has an AFC unit 1108 and an AFDC unit 1110, similar to that described above. The AFPD 1106 may provide audio function processing to assist an audio pre-processing unit 1112, an audio entity unit or units 1114, and other applications. The types of entities present here are described above as well. The logic modules 1104 also may include a coder 1118 to encode or decode audio-related data for transmission or receipt. These units may be used to perform the operations described above where relevant.

The acoustic signal processing system 1100 may have processor circuitry forming one or more processors 1120 which may include a CPU 1122, digital signal processors (DSPs) 1124, fixed function or shared hardware such as a machine language hardware 1125, AFC hardware hare 1126, ADFDCHW 1128, and/or other accelerators, such as an Intel Atom for example. The AFC hardware 1126 and AFDCHW 1128 may provide the processors (or hardware) for the AFPD 1116, while the AFC unit 1108 and AFDC unit 1110 may provide the software and firmware for the AFPD 1106. Otherwise, the processor circuitry may be as already described above.

The system 1100 also may have memory stores 1130 with one or more buffers 1132, one or more AMTs 1134, one or more WPBs 1136, and one or more local on-board or on-chip memories, such as L1, L2, or L3 cache for example, but may be other types of memory. The system 1100 also may have at least one speaker unit 1142, which may be an entity of the entity units 1114, to emit audio based on input acoustic signals, one or more displays 1148 to provide images 1150 of text, for example, as a visual response to the acoustic signals, other end device(s) 1146 to perform actions in response to the acoustic signal and that may include other entities, and antenna 1140. In one example implementation, the image processing system 1100 may have the microphone(s) 1102, speaker(s) 1142, at least one processor 1120 communicatively coupled to the microphone and speaker, at least one memory 1130 communicatively coupled to the processor and having the AMT 1134 and WPB 1136 as well as other memory such as local memory 1138. The antenna 1140 may be provided to transmit or receive audio-related signals or other types of signals. As illustrated, any of these components may be capable of communication with one another and/or communication with portions of logic modules 1104 and/or audio capture device 1102. Thus, processors 1120 may be communicatively coupled to the audio capture device 1102, the logic modules 1104, and the memory 1124 for operating those components.

Although acoustic signal processing system 1100, as shown in FIG. 11, may include one particular set of blocks or actions associated with particular components or modules, these blocks or actions may be associated with different components or modules than the particular component or module illustrated here.

Figure 12:
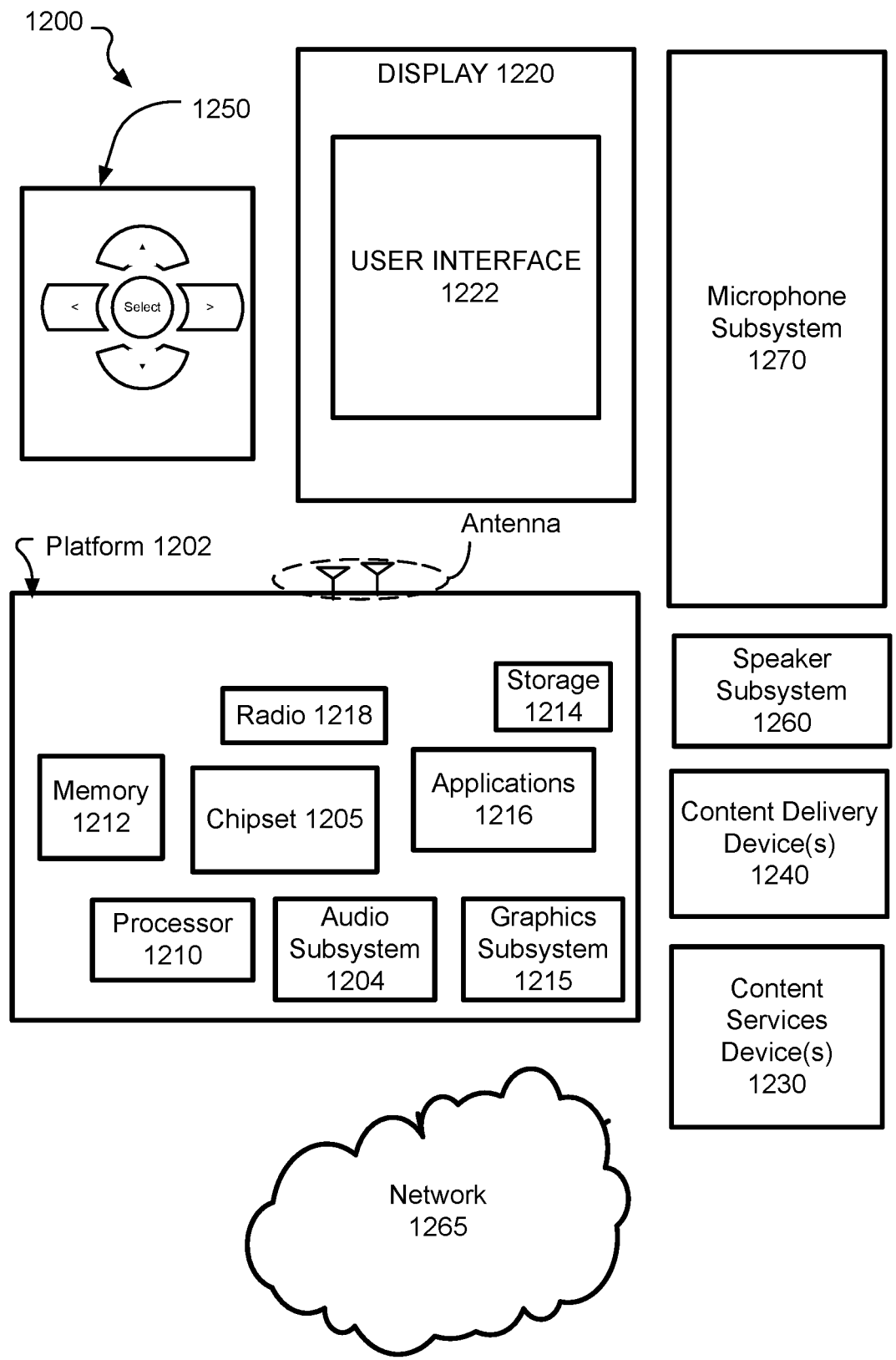
FIG. 12 is a schematic diagram of an example system or device.

Referring to FIG. 12, an example system 1200 in accordance with the present disclosure operates one or more aspects of the image processing system described herein. It will be understood from the nature of the system components described below that such components may be associated with, or used to operate, certain part or parts of the audio processing system described above. In various implementations, system 1200 may be a media system although system 1200 is not limited to this context. For example, system 1200 may be incorporated into one or more microphones or a network of microphones, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, but otherwise any device having a network of acoustic signal producing devices.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202, speaker subsystem 1260, microphone subsystem 1270, and/or display 1220. Each of these components is described in greater detail below.

In various implementations, platform 1202 may include any combination of a chipset 1205, processor 1210, memory 1212, storage 1214, audio subsystem 1204, graphics subsystem 1215, applications 1216 and/or radio 1218. Chipset 1205 may provide intercommunication among processor 1210, memory 1212, storage 1214, audio subsystem 1204, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM), and including L1, L2, L3, or any other type of cache memory.

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Audio subsystem 1204 may perform processing of audio such as acoustic signals for many different entities and/or computing devices, including for speech recognition, and/or speaker or voice recognition. The audio subsystem 1204 may comprise one or more processing units, memories, and accelerators. Such an audio subsystem may be integrated into processor 1210 or chipset 1205. In some implementations, the audio processors and hardware are as that described above being formed from SoCs, and whether on or separate from a mother board, for one example. Otherwise, the audio subsystem 1204 may be a stand-alone card communicatively coupled to chipset 1205. An interface may be used to communicatively couple the audio subsystem 1204 to a speaker subsystem 1260, microphone subsystem 1270, and/or display 1220.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, Display Port, wireless HDMI, and/or wireless HD compliant techniques. Graphics subsystem 1215 may be integrated into processor 1210 or chipset 1205. In some implementations, graphics subsystem 1215 may be a stand-alone card communicatively coupled to chipset 1205.

The audio processing techniques described herein may be implemented in various hardware architectures as mentioned above and by other structures. For example, audio functionality may be integrated within a chipset. Alternatively, a discrete audio processor may be used. As still another implementation, the audio functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220, speaker subsystem 1260, and microphone subsystem 1270. Platform 1202 and/or content services device(s) 1230 may be coupled to a network 1265 to communicate (e.g., send and/or receive) media information to and from network 1265. Content delivery device(s) 1240 also may be coupled to platform 1202, speaker subsystem 1260, microphone subsystem 1270, and/or to display 1220.

In various implementations, content services device(s) 1230 may include a network of microphones, a cable television box, personal computer, network, telephone, Internet enabled devices or appliance capable of delivering digital information and/or content, and any other similar device capable of unidirectionally or bidirectionally communicating content between content providers and platform 1202 and speaker subsystem 1260, microphone subsystem 1270, and/or display 1220, via network 1265 or directly. It will be appreciated that the content may be communicated unidirectionally and/or bidirectionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In embodiments, navigation controller 1250 may be a pointing device that may be a computer hardware component (specifically, a human interface device) that allows a user to input spatial (e.g., continuous, and multi-dimensional) data into a computer. Many systems such as graphical user interfaces (GUI), and televisions and monitors allow the user to control and provide data to the computer or television using physical gestures. The audio subsystem 1204 also may be used to control the motion of articles or selection of commands on the interface 1222.

Movements of the navigation features of controller 1250 may be replicated on a display (e.g., display 1220) by movements of a pointer, cursor, focus ring, or other visual indicators displayed on the display or by audio commands. For example, under the control of software applications 1216, the navigation features located on navigation controller 1250 may be mapped to virtual navigation features displayed on user interface 1222, for example. In implementations, controller 1250 may not be a separate component but may be integrated into platform 1202, speaker subsystem 1260, microphone subsystem 1270, and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example, or by auditory command. Program logic may allow platform 1202 to stream content to media adaptors or other content services device(s) 1230 or content delivery device(s) 1240 even when the platform is turned "off." In addition, chipset 1205 may include hardware and/or software support for 8.1 surround sound audio and/or high definition (7.1) surround sound audio, for example. Drivers may include an audio or graphics driver for integrated auditory or graphics platforms. In implementations, the audio or graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202, speaker subsystem 1260, microphone subsystem 1270, and/or display 1220 may be an integrated unit. Display 1220, speaker subsystem 1260, and/or microphone subsystem 1270 and content service device(s) 1230 may be integrated, or display 1220, speaker subsystem 1260, and/or microphone subsystem 1270 and content delivery device(s) 1240 may be integrated, for example. These examples are not meant to limit the present disclosure.

In various implementations, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 12.

Figure 13:
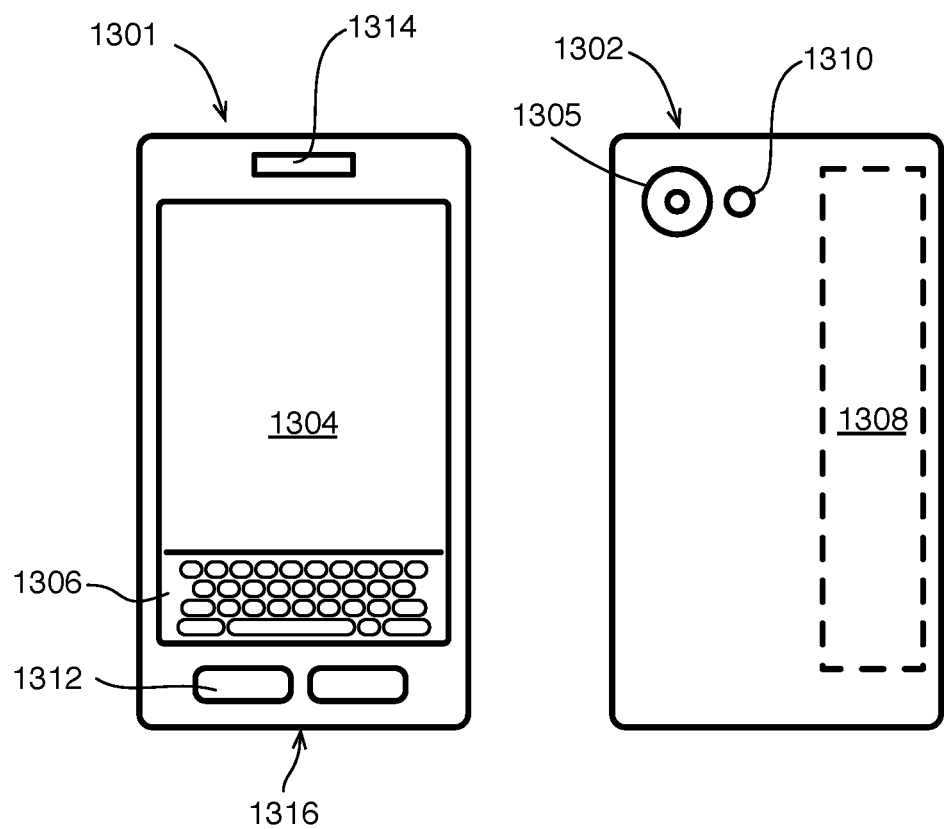
FIG. 13 illustrates another example system or device, all arranged in accordance with at least some implementations of the present disclosure.

Referring to FIG. 13, a small form factor device 1300 is one example of the varying physical styles or form factors in which system 1100 or 1200 may be embodied. By this approach, device 1300 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system that receives acoustic signals or data from multiple microphones such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, speaker system, microphone system or network, and so forth, and any other on-board (such as on a vehicle), or building, computer that may accept audio commands.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, device 1300 may include a housing with a front 1301 and a back 1302, a display or screen 1304, an input/output (I/O) device 1306, and an antenna 1308. Device 1300 also may include navigation features 1312. Display 1304 may provide images processed by any suitable display unit for displaying information appropriate for a mobile computing device. I/O device 1306 may include any suitable I/O device for entering information into a mobile computing device. Examples for I/O device 1306 may include an alphanumeric keyboard, a numeric keypad, a touch pad, input keys, buttons, switches, rocker switches, software and so forth. Information also may be entered into device 1300 by way of a network of two or more microphones 1316. Such information may be processed by a separation and localization device as described herein as well as other acoustic mixing devices, speech and/or voice recognition devices, and so forth, as part of the device 1300. By one form, multiple devices 1300 spaced from each may be used to perform the acoustic data collection described above. Device 1300 also may provide audio responses via a speaker 1314 or visual responses via the screen 1304. The implementations are not limited in this context. The housing also may include a camera 1305 and an illuminator 1310.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, an audio function processing device comprises memory; an address mapping table; and an audio function processing unit arranged to obtain audio function processing first addresses that have a format in compliance with an audio function processing interface standard, and arranged to convert the first addresses into memory addresses by using the first addresses to generate look-ups having a bit size set to reduce a memory address range available from the address mapping table, wherein the memory addresses are arranged to be used to read or write to the memory address on the memory.

By one or more second implementations, and further to the first implementation, wherein the first addresses comprise data indicating (1) a control setting of an audio function of an audio processing entity, (2) audio signal data, or (3) implementation data used to implement audio function processing.

By one or more third implementations, and further to the first or second implementation, wherein the audio function processing unit is arranged to use the first address or a rearranged version of the first address to generate the look-up to find m-most significant bits of the memory address in the address mapping table.

By one or more fourth implementations, and further to any of the first to third implementation, wherein the look-up is n-most significant bits of the first address or the rearranged version of the first address.

By one or more fifth implementations, and further to any of the first to fourth implementation, wherein the look-up has less than half the bits of the first address.

By one or more sixth implementations, and further to any of the first to fifth implementation, wherein a size of the look-up is three to ten bits.

By one or more seventh implementations, and further to any of the first to sixth implementation, wherein a size of the look-up is six bits.

By one or more eighth implementations, and further to any of the first to seventh implementation, wherein the look-up is generated by using a first set of most-significant bits of the first address to determine if the first address is within a control range of addresses, and using a second set of most significant bits different from the first set and from the first address as the look-up when the first address is not a control address.

By one or more ninth implementations, and further to any of the first to seventh implementation, wherein the audio processing function unit is arranged to rearrange the first address before forming the look-up, wherein the rearranging comprises swizzling the first address to combine multiple fields each of function, entity, control selection, and control number fields from the first address, and drop any other field from the first address.

By one or more tenth implementations, and further to any of the first to ninth implementation, wherein the audio processing function unit is arranged to combine the bits of a memory address portion obtained from the address mapping table to bits from the first address or a rearranged version of the first address to form a full memory address.

By one or more eleventh implementations, and further to the tenth implementation, wherein the full memory address has 32 bits including most significant bits from the address mapping table and least significant bits from either the first address or the rearranged version of the first address.

By an example twelfth implementation, a computer-implemented method of audio processing comprises receiving a first address in a format of an audio function processing interface standard; converting the first address into a memory address using an address mapping table and comprising using the first address to generate a look-up with a bit size set to reduce a number of memory address portions each of a different memory address available by using the address mapping table; and providing the memory address to perform a read or write to the memory address on a memory.

By one or more thirteenth implementations, and further to the twelfth implementation, wherein the memory is local on-chip memory.

By one or more fourteenth implementations, and further to the twelfth or thirteenth implementation, wherein the address mapping table is divided into a control range of addresses and non-control range of addresses.

By one or more fifteenth implementations, and further to any one of the twelfth to fourteenth implementation, wherein the method comprising using (1) part of the first address directly as a look-up on the address mapping table or (2) part of a rearranged version of the first address as a look-up on the address mapping table, depending on whether the first address falls within a predetermined control range of addresses.

By one or more sixteenth implementations, and further to any of the twelfth to fifteenth implementation, wherein the converting comprises swizzling the first address into a rearranged address; and using less than all bits of the rearranged address to look up at least the memory address portion of the memory address on the address mapping table.

By one or more seventeenth implementations, and further to the sixteenth implementation, wherein the converting comprises using n most significant bits (MSBs) of the rearranged address as a lookup on the address mapping table.

By one or more eighteenth implementations, and further to the sixteenth implementation, wherein the method comprising using the MSBs of the rearranged address to look-up the m-most significant bits of the memory address.

By one or more nineteenth implementations, and further to the eighteenth implementation, wherein the method comprising combining the m-most significant bits of the memory address to other bits of the rearranged address to form the memory address.

By an example twentieth implementation, at least one non-transitory computer readable medium comprising a plurality of instructions that in response to being executed on a computing device, causes the computing device to operate by: receiving a first address in a format of an audio function processing interface standard; converting the first address into a memory address using an address mapping table comprising generating a look-up at least partly based on the first address and wherein the bit size of the look-up is predetermined to reduce a number of memory address portions each of a different memory address available by using the address mapping table; and providing the memory address to perform a read or write to the memory address on a memory.

By one or more twenty-first implementations, and further to the twentieth implementation, wherein the instructions cause the computing device to operate by using n-most significant bits of the first address to look up m-most significant bits of the memory address on the address mapping table, and combining the m-most significant bits of the memory address with other bits of the first address to form a full memory address.

By one or more twenty-second implementations, and further to the twentieth implementation, wherein the instructions cause the computing device to operate by using n-most significant bits of a rearranged version of the first address as the look-up when the n-most significant bits of the first address are within a control address range.

By one or more twenty-third implementations, and further to the twentieth implementation, wherein the instructions cause the computing device to operate by using one set of most significant bits of the first address as a look-up when another set of most significant bits of the first address are within a non-control range of the address mapping table.

By one or more twenty-fourth implementations, and further to any of the twentieth to twenty-third implementation, wherein the look-up is formed from bits from a function field or entity field or both of the first address and no other fields.

By one or more twenty-fifth implementations, and further to any of the twentieth to twenty-fourth implementation, wherein the instructions cause the computing device to operate by writing to a write pending buffer to collect writes so that at least one processor is awakened to perform a group of writes during one awake period rather than being woken at separate times for each write forming the group of writes.

In one or more twenty-sixth implementations, a device or system includes a memory and a processor to perform a method according to any one of the above implementations.

In one or more twenty-seventh implementations, at least one machine readable medium includes a plurality of instructions that in response to being executed on a computing device, cause the computing device to perform a method according to any one of the above implementations.

In one or more twenty-eighth implementations, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. An audio function processing device comprising:
   memory;
   an address mapping table; and
   an audio function processing unit configured to:
   obtain a first address that has a format in compliance with an audio function processing interface standard,
   generate, based on the first address, a remapped address including removing first selected portions of the first address and rearranging second selected portions of the first address,
   use the remapped address as a look-up on the address mapping table to convert the first address to a memory address on the memory, and
   perform one of a read operation and a write operation to the memory address on the memory.

2. The device of claim 1 wherein the first addresses comprise address comprises data indicating (1) a control setting of an audio function of an audio processing entity, (2) audio signal data, or (3) implementation data used to implement audio function processing.

3. The device of claim 1 wherein the audio function processing unit is arranged to use selected most significant bits of the remapped address as the look-up on the address mapping table to find m-most significant bits of the memory address in the address mapping table.

4. The device of claim 1 wherein the look-up is n-most significant bits of the first address or n-most significant bits of the remapped address.

5. The device of claim 1 wherein the look-up has less than half the bits of the first address.

6. The device of claim 1 wherein a size of the look-up is three to ten bits.

7. The device of claim 1 wherein a size of the look-up is six bits.

8. The device of claim 1 wherein the look-up is generated by using a first set of most-significant bits of the first address to determine if the first address is within a control range of addresses, and, when the first address is not a control address, using a second set of most significant bits different from the first set and from the first address as the look-up.

9. The device of claim 1 wherein the audio processing function unit includes an address decoder to generate the remapped address, wherein generating the remapped address comprises swizzling the first address to combine multiple fields each of function, entity, control selection, and control number fields from the first address, and removing any other field from the first address.

10. The device of claim 1 wherein the audio processing function unit includes an address decoder to convert the first address to the memory address on the memory by combining bits of a memory address portion obtained from the address mapping table with bits from one of the first address and the remapped address to form the memory address.

11. The device of claim 10 wherein the full memory address has 32 bits including most significant bits from the address mapping table and least significant bits from either the first address or the the remapped address.

12. A computer-implemented method of audio processing, comprising:
    receiving a first address in a format of an audio function processing interface standard;
    generating, based on the first address, a remapped address including removing first selected portions of the first address and rearranging second selected portions of the first address;
    using the remapped address as a look-up on an address mapping table to convert the first address to a memory address on a memory; and
    performing a read or write to the memory address on the memory.

13. The method of claim 12 wherein the memory is local on-chip memory.

14. The method of claim 12 wherein the address mapping table is divided into a control range of addresses and non-control range of addresses.

15. The method of claim 12, further comprising using (1) part of the first address directly as the look-up on the address mapping table or (2) part of the remapped address as the look-up on the address mapping table, depending on whether the first address falls within a predetermined control range of addresses.

16. The method of claim 12 wherein the generating the remapped address comprises swizzling the first address into the remapped address; and using less than all bits of the remapped address to look up the memory address on the address mapping table.

17. The method of claim 16 wherein converting the first address to the memory address comprises using n most significant bits of the remapped address as the lookup on the address mapping table.

18. The method of claim 16, further comprising using the n most significant bits of the remapped address to look-up m most significant bits of the memory address.

19. The method of claim 18, further comprising combining the m most significant bits of the memory address with other bits of the remapped address to form the memory address.

20. At least one non-transitory computer readable medium comprising a plurality of instructions that in response to being executed on a computing device, causes the computing device to operate by:
receiving a first address in a format of an audio function processing interface standard;
generating, based on the first address, a remapped address including removing first selected portions of the first address and rearranging second selected portions of the first address;
using the remapped address as a look-up on an address mapping table to convert the first address to a memory address on a memory; and
performing a read or write to the memory address on the memory.

21. The medium of claim 20 wherein the instructions further cause the computing device to operate by using n-most significant bits of the first address to look up m-most significant bits of the memory address on the address mapping table, and combining the m-most significant bits of the memory address with other bits of the first address to form a full memory address.

22. The medium of claim 20 wherein the instructions further cause the computing device to operate by using n-most significant bits of the remapped address as the look-up when the n-most significant bits of the first address are within a control address range.

23. The medium of claim 20 wherein the instructions further cause the computing device to operate by using a first set of most significant bits of the first address as a look-up when a second set of most significant bits of the first address are within a non-control range of the address mapping table.

24. The medium of claim 20 wherein the remapped address includes bits from a function field or entity field or both of the first address and no other fields.

25. The medium of claim 20 wherein the instructions further cause the computing device to operate by writing to a write pending buffer to collect writes so that at least one processor is awakened to perform a group of writes during one awake period rather than being woken at separate times for each write forming the group of writes.

* * * * *